United States Patent
Lee et al.

(10) Patent No.: US 12,457,418 B2
(45) Date of Patent: *Oct. 28, 2025

(54) ACTUATOR FOR OPTICAL IMAGE STABILIZATION AND CAMERA MODULE INCLUDING THE SAME

(71) Applicant: SAMSUNG ELECTRO-MECHANICS CO., LTD., Suwon-si (KR)

(72) Inventors: Kyung Hun Lee, Suwon-si (KR); Jong Ho Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 277 days.

This patent is subject to a terminal disclaimer.

(21) Appl. No.: 18/360,454

(22) Filed: Jul. 27, 2023

(65) Prior Publication Data

US 2024/0214682 A1    Jun. 27, 2024

(30) Foreign Application Priority Data

Dec. 27, 2022  (KR) ........................ 10-2022-0186142

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC ...... H04N 23/687; H04N 23/55; H04N 23/54; H04N 23/57
USPC .................................................... 348/208.7
See application file for complete search history.

(56) References Cited

U.S. PATENT DOCUMENTS

| 10,033,303 | B2* | 7/2018 | Liu | H10N 30/20 |
|---|---|---|---|---|
| 10,638,031 | B1* | 4/2020 | Brodie | G03B 3/10 |
| 10,725,313 | B2* | 7/2020 | Sugawara | H04N 23/57 |
| 10,890,734 | B1* | 1/2021 | Sharma | H04N 23/57 |
| 10,924,675 | B2* | 2/2021 | Hubert | H05K 1/189 |
| 11,048,147 | B2* | 6/2021 | Sharma | G03B 3/04 |

(Continued)

FOREIGN PATENT DOCUMENTS

| CN | 116264639 A | 6/2023 |
|---|---|---|
| KR | 10-2020-0118391 A | 10/2020 |

(Continued)

OTHER PUBLICATIONS

Chinese Office Action issued on May 17, 2024, in counterpart Chinese Patent Application No. 202322833705.9 (4 pages in English, 3 pages in Chinese).

(Continued)

*Primary Examiner* — Pritham D Prabhakher
(74) *Attorney, Agent, or Firm* — NSIP Law

(57) ABSTRACT

An actuator for optical image stabilization includes a fixed frame having an internal space, a movable frame accommodated in the fixed frame and movable relative to the fixed frame, a first driving unit including a plurality of coils disposed on one of the fixed frame and the movable frame and a plurality of magnets disposed on the other, and a sensor substrate including a moving portion coupled to the movable frame, wherein a wiring pattern is disposed inside one of the fixed frame and the movable frame, and the plurality of coils and the sensor substrate are electrically connected by the wiring pattern.

19 Claims, 28 Drawing Sheets

(56) References Cited

U.S. PATENT DOCUMENTS

| | | | | |
|---|---|---|---|---|
| 11,483,461 B2* | 10/2022 | Sommer | | H04N 23/55 |
| 11,743,565 B1* | 8/2023 | Liao | | H04N 23/54 |
| | | | | 348/376 |
| 11,743,586 B2* | 8/2023 | Smyth | | G03B 30/00 |
| | | | | 348/208.11 |
| 11,910,090 B2* | 2/2024 | Kwon | | H04N 23/687 |
| 12,003,855 B2* | 6/2024 | Huang | | H04N 23/687 |
| 12,075,142 B2* | 8/2024 | Miller | | H05K 1/0281 |
| 12,212,834 B1* | 1/2025 | Smyth | | H02K 41/0354 |
| 12,219,255 B1* | 2/2025 | Xu | | H04N 23/54 |
| 12,238,419 B2* | 2/2025 | Jang | | H01F 7/20 |
| 2017/0133951 A1* | 5/2017 | Liu | | G02B 7/09 |
| 2018/0171991 A1* | 6/2018 | Miller | | G02B 7/023 |
| 2018/0192217 A1* | 7/2018 | Hogan | | H04R 29/003 |
| 2019/0049692 A1* | 2/2019 | Choi | | G02B 7/09 |
| 2019/0137728 A1* | 5/2019 | Wan | | H04N 23/54 |
| 2019/0141248 A1* | 5/2019 | Hubert | | H02K 41/0356 |
| 2020/0050083 A1* | 2/2020 | Jeong | | G03B 13/34 |
| 2021/0006720 A1* | 1/2021 | Enta | | H04N 23/45 |
| 2022/0014677 A1* | 1/2022 | Smyth | | H04N 23/55 |
| 2022/0190015 A1* | 6/2022 | Baik | | H04N 25/00 |
| 2022/0353416 A1 | 11/2022 | Kwon et al. | | |
| 2023/0156334 A1* | 5/2023 | Jang | | H01F 7/20 |
| | | | | 348/208.7 |
| 2023/0188851 A1 | 6/2023 | Lee et al. | | |

FOREIGN PATENT DOCUMENTS

| | | |
|---|---|---|
| KR | 10-2021-0076347 A | 6/2021 |
| KR | 10-2022-0019491 A | 2/2022 |
| KR | 10-2022-0149424 A | 11/2022 |

OTHER PUBLICATIONS

Korean Office Action issued on Oct. 15, 2024, in counterpart Korean Patent Application No. 10-2022-0186142 (8 pages in English, 6 pages in Korean).

* cited by examiner

200~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~
ACTUATOR FOR OPTICAL IMAGE STABILIZATION AND CAMERA MODULE INCLUDING THE SAME

CROSS-REFERENCE TO RELATED APPLICATIONS

This application claims the benefit under 35 USC 119(a) of Korean Patent Application No. 10-2022-0186142 filed on Dec. 27, 2022, in the Korean Intellectual Property Office, the entire disclosure of which is incorporated herein by reference for all purposes.

BACKGROUND

1. Field

The present disclosure relates to an actuator for optical image stabilization and a camera module including the same.

2. Description of the Background

Camera modules may be adopted in mobile communication terminals, such as smartphones, tablet PCs, and laptop computers.

In addition, camera modules may be equipped with an actuator having a focus adjustment function (or an autofocusing function) and an optical image stabilization function in order to generate high-resolution images.

For example, the focus may be adjusted by moving a lens module in an optical axis (a Z-axis) direction, or shaking may be corrected by moving the lens module in a direction perpendicular to the optical axis (the Z-axis).

However, as the performance of camera modules is improved, the weight of the lens module may increase and the weight of a driving unit for moving the lens module may also be affected, which may make it difficult to precisely control driving force for optical image stabilization.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator for optical image stabilization includes a fixed frame having an internal space, a movable frame accommodated in the fixed frame and movable relative to the fixed frame, a first driving unit including a plurality of coils disposed on one of the fixed frame and the movable frame and a plurality of magnets disposed on the other, and a sensor substrate including a moving portion coupled to the movable frame, wherein a wiring pattern is disposed inside one of the fixed frame and the movable frame, and the plurality of coils and the sensor substrate are electrically connected by the wiring pattern.

An image sensor may be disposed on the moving portion.

The actuator may further include a first ball member disposed between the fixed frame and the movable frame, wherein any one of the fixed frame and the movable frame may include a first frame in which the plurality of coils are disposed and a second frame in which the first ball member is disposed, and the first frame and the second frame may be formed of the same or different plastic materials, respectively.

A plurality of yokes facing the plurality of magnets may be disposed in the first frame.

A support pad may be disposed inside the second frame, and one surface of the support pad may be exposed externally of the second frame to contact the first ball member.

The plurality of coils may be disposed on the movable frame, and one end of the wiring pattern may be connected to the plurality of coils, and the other end of the wiring pattern may be connected to the moving portion.

The sensor substrate may further include a fixed portion coupled to the fixed frame and a connection portion connecting the moving portion to the fixed portion, and the connection portion may extend along a circumference of the moving portion.

The connection portion may include a first support portion and a second support portion, the first support portion may have one side connected to the moving portion and the other side spaced apart from the fixed portion, the second support may have one side connected to the fixed portion and the other side spaced apart from the moving portion.

The plurality of coils may be disposed on the fixed frame, and one end of the wiring pattern may be connected to the plurality of coils, and the other end of the wiring pattern may be connected to the fixed portion.

An image sensor may be disposed on the moving portion, the first driving unit may include a first sub-driving unit including a first magnet and a first coil and a second sub-driving unit including a second magnet and a second coil, the first sub-driving unit and the second sub-driving unit may generate driving force in directions parallel to an imaging surface of the image sensor and perpendicular to each other.

At least one of the first coil and the second coil may include two coils, and a position sensor may be disposed inside each of the two coils.

The movable frame may include a plurality of damping recesses, the fixed frame may include a plurality of damping pins extending toward the plurality of damping recesses, a damping gel may be disposed in the plurality of damping recesses, and at least a portion of the plurality of damping pins may be inserted into the damping gel.

A camera module may include the actuator, a housing disposed on the fixed frame and having an internal space, and a lens module accommodated in the internal space and configured to be movable in an optical axis direction.

In another general aspect, a camera module includes a housing having an internal space, a lens module accommodated in the internal space and configured to be movable in an optical axis direction, a fixed frame fixedly disposed in the housing, a movable frame, movable relative to the fixed frame in a direction, perpendicular to the optical axis direction, a first driving unit including a plurality of coils disposed on one of the fixed frame and the movable frame and a plurality of magnets disposed on the other, and a sensor substrate including a moving portion coupled to the movable frame, and an image sensor disposed on the moving portion, wherein a wiring pattern is disposed inside one of the fixed frame and the movable frame, and one end of the wiring pattern is connected to the plurality of coils, and the other end of the wiring pattern is connected to the sensor substrate.

The plurality of coils may be disposed on the movable frame, and the wiring pattern may include a wiring portion connected to the plurality of coils and a terminal portion connected to the moving portion.

The sensor substrate may further include a fixed portion coupled to the fixed frame and a connection portion connecting the moving portion to the fixed portion, the plurality of coils may be disposed on the fixed frame, and the wiring pattern may include a wiring portion connected to the plurality of coils and a terminal portion connected to the fixed portion.

The camera module may further include a first ball member disposed between the fixed frame and the movable frame, wherein any one of the fixed frame and the movable frame may include a first frame in which the plurality of coils may be arranged and a second frame in which the first ball member may be disposed, and a boundary line may be formed between the first frame and the second frame.

In another general aspect, an optical image stabilization actuator includes a fixed frame, a movable frame disposed on the fixed frame and configured to be movable relative to the fixed frame, a wiring pattern insert-injected in one of the fixed frame and the movable frame, and a coil directly connected to an exposed portion of the insert-injected wiring pattern, wherein the wiring pattern may be configured to supply power to the coil.

The actuator may further include a magnet disposed on the other of the fixed frame and the movable frame to face the coil, and a sensor substrate including a moving portion coupled to the movable frame, wherein the coil and the sensor substrate may be electrically connected by the wiring pattern.

A portable electronic device may include a camera module, the actuator, a lens module accommodated in an internal space of a housing disposed on the fixed frame, and the lens module configured to be movable in an optical axis direction, and a sensor substrate including a moving portion coupled to the movable frame, and an image sensor disposed on the moving portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
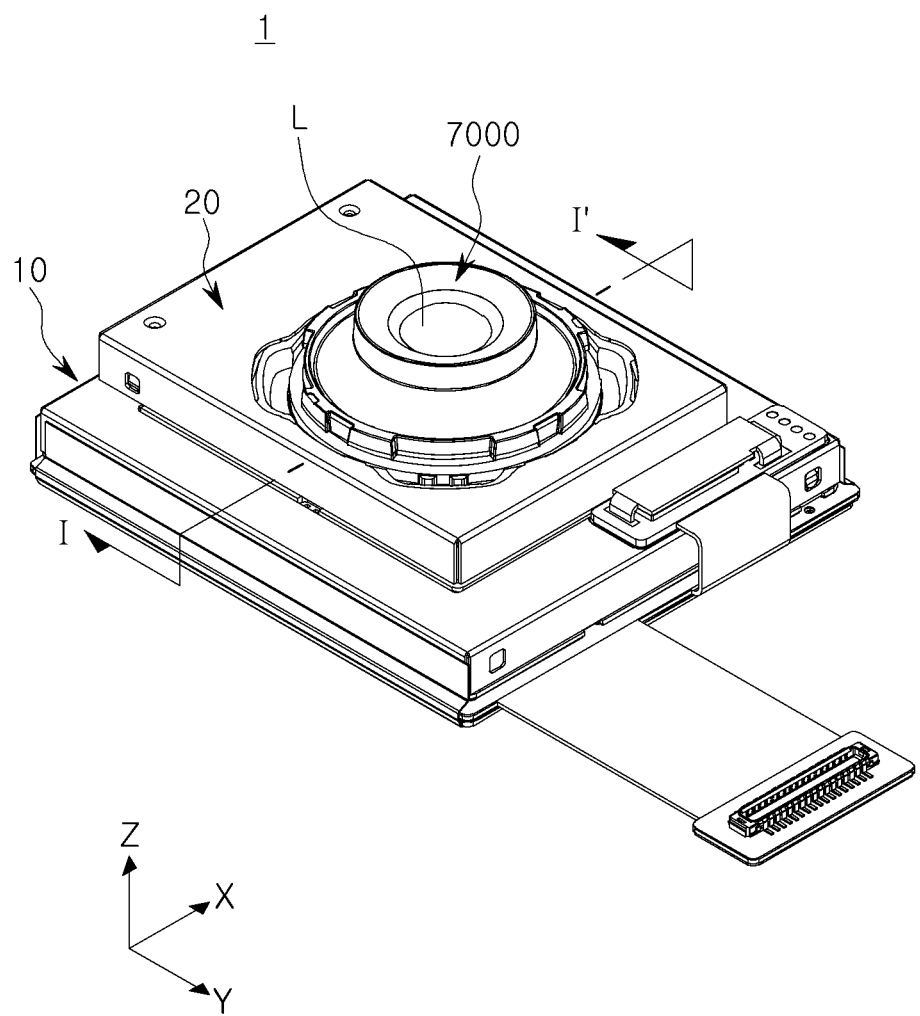
FIG. 1 is a perspective view of a camera module according to an example embodiment in the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more example embodiments as described herein may provide an actuator for optical image stabilization capable of improving optical image stabilization and a camera module including the same.

An actuator for optical image stabilization (OIS) and a camera module including the same according to an example embodiment in the present disclosure may be installed in a portable electronic device. The portable electronic device may include a mobile communication terminal, a smartphone, or a tablet PC.

Figure 2:
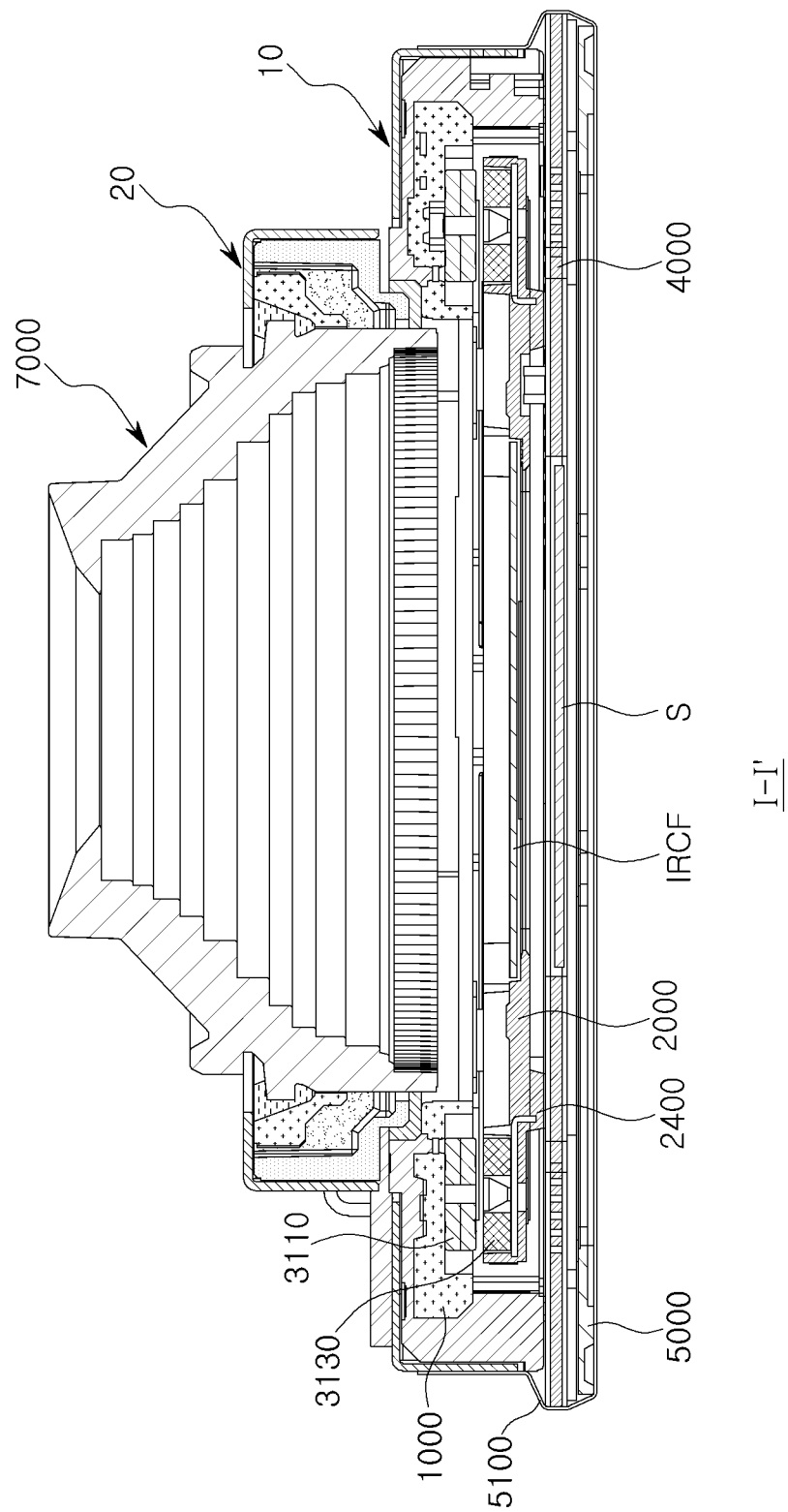
FIG. 2 is a cross-sectional view taken along line I-I' of FIG. 1.
Figure 3:
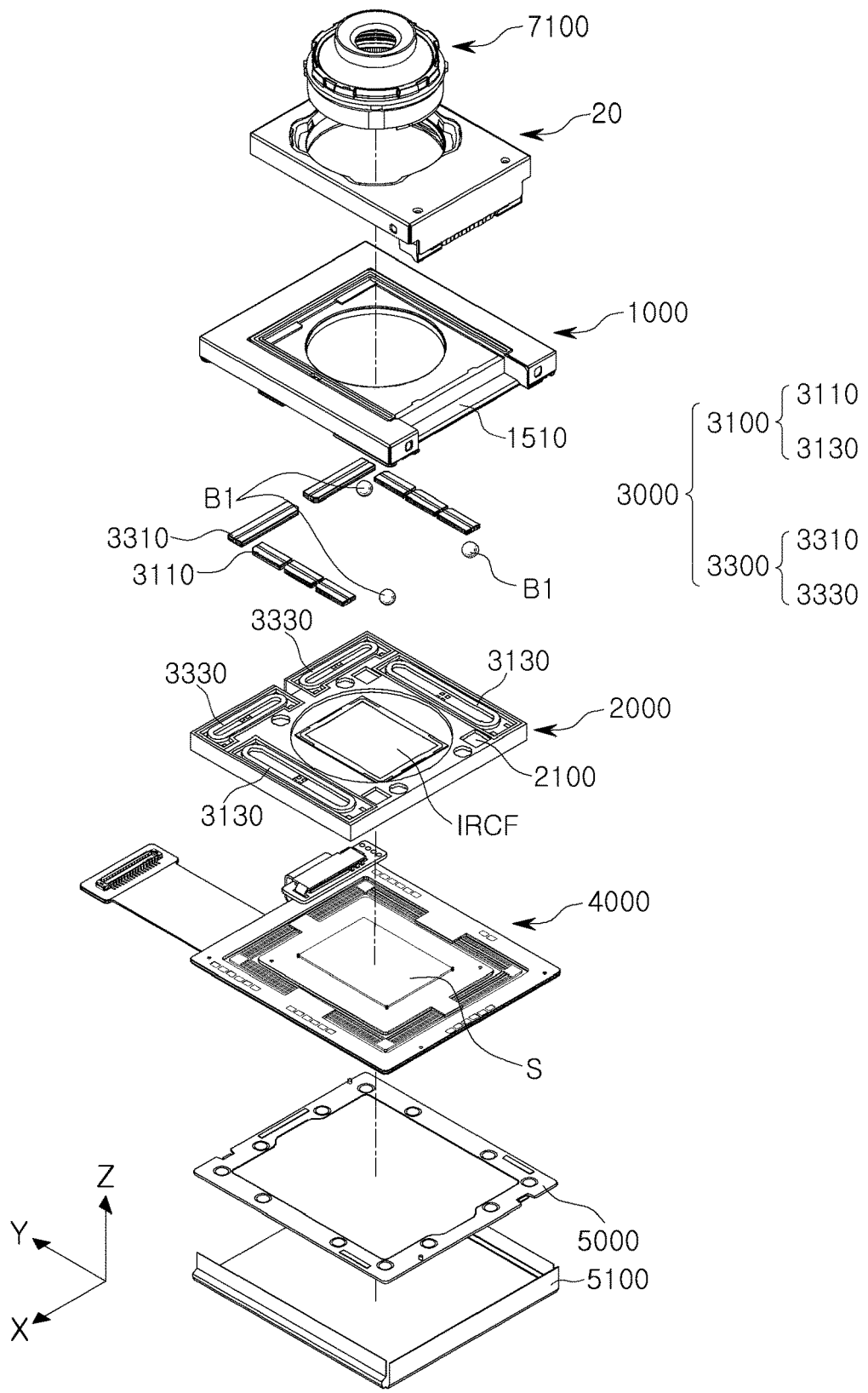
FIG. 3 is a schematic exploded perspective view of a camera module according to an example embodiment in the present disclosure.

FIG. 1 is a perspective view of a camera module according to an example embodiment in the present disclosure, FIG. 2 is a cross-sectional view taken along the line I-I' of FIG. 1, and FIG. 3 is a schematic exploded perspective view of a camera module according to an example embodiment in the present disclosure.

Figure 4:
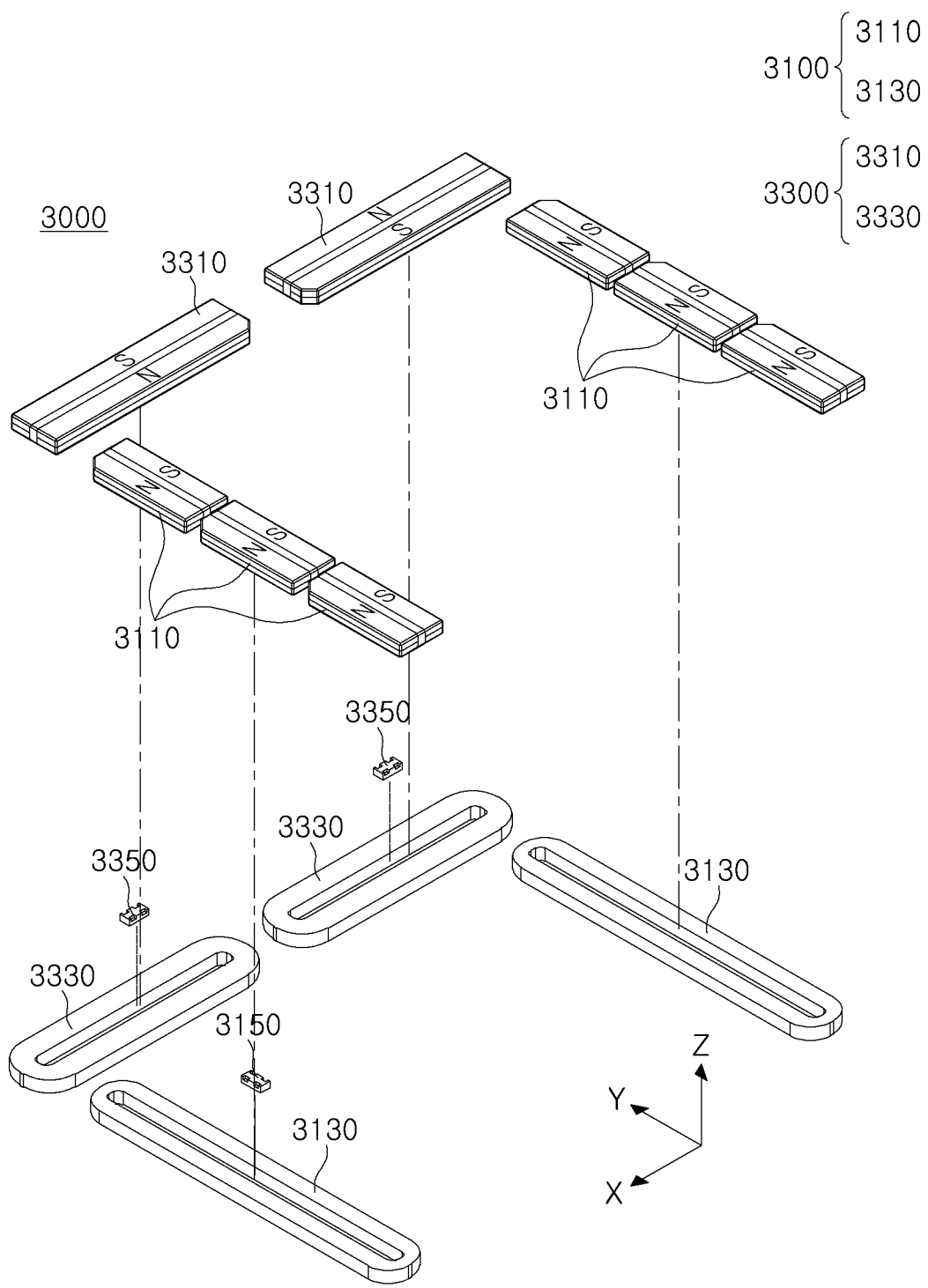
FIG. 4 is an exploded perspective view of a first driving unit of a first actuator according to an example embodiment in the present disclosure.

FIG. 4 is an exploded perspective view of a first driving unit of a first actuator according to an example embodiment in the present disclosure.

Referring to FIGS. 1 to 4, a camera module 1 according to an example embodiment in the present disclosure includes a lens module 7000, an image sensor S, a first actuator 10, and a second actuator 20.

The first actuator 10 is an actuator for OIS, and the second actuator 20 is an actuator for focus adjustment.

The lens module 7000 includes at least one lens L and a lens barrel 7100. The at least one lens L is disposed inside the lens barrel 7100. When a plurality of lenses L are provided, the plurality of lenses L are mounted inside the lens barrel 7100 along an optical axis (a Z-axis).

The lens module 7000 may further include a carrier 7300 (FIG. 15) coupled to the lens barrel 7100.

The carrier 7300 may include a hollow portion penetrating through the carrier 7300 in the optical axis (the Z-axis) direction, and the lens barrel 7100 is inserted into the hollow portion and fixedly disposed with respect to the carrier 7300.

In an example embodiment in the present disclosure, the lens module 7000 is a moving member moving in the optical axis (the Z-axis) direction during autofocusing (AF). To this end, the camera module 1 according to an example embodiment in the present disclosure includes the second actuator 20.

The lens module 7000 may be moved in the optical axis (the Z-axis) direction by the second actuator 20 to adjust the focus.

The lens module 7000 is a fixed member that does not move during OIS.

The camera module 1 according to an example embodiment in the present disclosure may perform OIS by moving the image sensor S instead of the lens module 7000. Since the relatively light image sensor S is moved, the image sensor S may be moved with less driving force. Therefore, OIS may be performed more accurately.

To this end, the camera module 1 according to an example embodiment in the present disclosure includes a first actuator 10.

The image sensor S may be moved in a direction, perpendicular to the optical axis (the Z-axis), by the first actuator 10 or rotated about the optical axis (the Z-axis) as a rotation axis to compensate for shaking (i.e., to perform optical image stabilization).

That is, the image sensor S may be moved in a direction, perpendicular to a direction in which an imaging surface of the image sensor S faces, by the first actuator 10. For example, the image sensor S may be moved in a direction, perpendicular to the optical axis (the Z-axis), or rotated about the optical axis (the Z-axis) as a rotation axis to compensate for shaking.

In this specification, the direction in which the imaging surface of the image sensor S faces may be referred to as the optical axis (the Z-axis) direction. That is, the image sensor S may move in a direction, perpendicular to the optical axis (the Z-axis).

In the drawings of this specification, moving the image sensor S in a direction, parallel to the imaging surface may be understood as moving the image sensor S in a direction, perpendicular to the optical axis (the Z-axis).

In addition, moving the image sensor S in a first axis direction (an X-axis direction) or a second axis direction (a Y-axis direction) may be understood as moving the image sensor S in a direction, perpendicular to the optical axis (the Z-axis direction).

In addition, although it is described that the image sensor S is rotated around the optical axis (the Z-axis) as a rotation axis for convenience, when the image sensor S is rotated, a rotation axis thereof may not coincide with the optical axis (the Z-axis). For example, the image sensor S may be rotated using any one axis, parallel to the optical axis (the Z-axis), as a rotation axis.

In addition, the first axis direction (X direction) and the second axis direction (the Y-axis direction) are examples of two directions that are perpendicular to the optical axis (the Z-axis) and cross each other, and in this specification, the first axis direction (the X-axis direction) and the second axis direction (the Y-axis direction) may be understood as two directions that are perpendicular to the optical axis (the Z-axis) and cross each other.

The first actuator 10 may include a fixed frame 1000, a movable frame 2000, a first driving unit 3000, and a sensor substrate 4000, and may further include a base 5000.

The fixed frame 1000 is coupled to the second actuator 20 to be described below. For example, the fixed frame 1000 may be coupled to a housing 6000 (FIG. 15) of the second actuator 20.

The fixed frame 1000 is a fixed member that does not move during focus adjustment (i.e., autofocusing (AF)) and OIS.

The fixed frame 1000 may have a rectangular plate shape with a center penetrated in the optical axis (the Z-axis) direction.

The movable frame 2000 is accommodated in the fixed frame 1000. The fixed frame 1000 may have a side wall extending downwards in the optical axis (the Z-axis) direction, and thus, the fixed frame 1000 may have an accommodation space for accommodating the movable frame 2000.

The movable frame 2000 may be moved relative to the fixed frame 1000 in a direction, perpendicular to the optical axis (the Z-axis), or rotated based on the optical axis (the Z-axis) as a rotation axis. That is, the movable frame 2000 is a moving member that moves during OIS.

For example, the movable frame 2000 is configured to be movable in the first axis (the X-axis) direction and the second axis (the Y-axis) direction, and may be rotated based on the optical axis (the Z-axis) as a rotation axis.

The first axis (the X-axis) direction may refer to a direction, perpendicular to the optical axis (the Z-axis), and the second axis (the Y-axis) direction may refer to a direction, perpendicular to both the optical axis (the Z-axis) direction and the first axis (the X-axis) direction.

The movable frame 2000 may have a square plate shape with a center penetrated in the optical axis (the Z-axis) direction.

An infrared cut-off filter (IRCF) may be mounted on an upper surface of the movable frame 2000. The sensor substrate 4000 may be mounted on a lower surface of the movable frame 2000.

A first ball member B1 is disposed between the fixed frame 1000 and the movable frame 2000.

The first ball member B1 is disposed to contact each of the fixed frame 1000 and the movable frame 2000.

When the first ball member B1 is moved or rotated relative to the fixed frame 1000, the first ball member B1 rolls between the fixed frame 1000 and the movable frame 2000 to support movement of the movable frame 2000.

Referring to FIG. 3, the image sensor S is mounted on the sensor substrate 4000. A portion of the sensor substrate 4000 is coupled to the movable frame 2000. Also, another portion of the sensor substrate 4000 may be coupled to the fixed frame 1000. As another example, the other portion of the sensor substrate 4000 may also be coupled to the base 5000.

The image sensor S is mounted on a portion of the sensor substrate 4000 coupled to the movable frame 2000.

Since a portion of the sensor substrate 4000 is coupled to the movable frame 2000, as the movable frame 2000 is moved or rotated, a portion of the sensor substrate 4000 may also be moved or rotated together with the movable frame 2000.

Accordingly, the image sensor S may be moved or rotated on a plane, perpendicular to the optical axis (the Z-axis), to compensate for shaking during image capture.

The first driving unit 3000 generates driving force in a direction, perpendicular to the optical axis (the Z-axis), to move the movable frame 2000 in a direction, perpendicular to the optical axis (the Z-axis), or rotate the movable frame 2000 based on the optical axis (the Z-axis) as a rotation axis.

The first driving unit 3000 includes a first sub-driving unit 3100 and a second sub-driving unit 3300. The first sub-driving unit 3100 may generate driving force in the first axis (the X-axis) direction, and the second sub-driving unit 3300 may generate driving force in the second axis (the Y-axis) direction.

The first sub-driving unit 3100 includes a first magnet 3110 and a first coil 3130. The first magnet 3110 and the first coil 3130 may be disposed to face each other in the optical axis (the Z-axis) direction.

The first magnet 3110 is disposed on the fixed frame 1000. The first magnet 3110 may include a plurality of magnets. For example, the first magnet 3110 may include two sets of magnets spaced apart from each other in a direction (the first axis (the X-axis) direction) in which driving force is generated by the first magnet 3110. At least two magnets may be included for each set. The magnets included in each set may be spaced apart from each other in the second axis (the Y-axis) direction.

It is also possible to use one magnet elongated in the second axis (the Y-axis) direction, but the magnet elongated to one side may have a risk of damage during manufacture. Therefore, reliability during manufacturing may be improved by arranging a plurality of magnets spaced apart from each other in a longitudinal direction as a set.

The fixed frame 1000 may have a mounting recess in which the first magnet 3110 is disposed. By disposing the first magnet 3110 in the mounting recess, it is possible to prevent the overall height of the first actuator 10 and the camera module 1 from increasing due to a thickness of the first magnet 3110.

One surface of the first magnet 3110 (e.g., a surface facing the first coil 3130) may be magnetized to have both an N pole and an S pole. For example, an N pole, a neutral region, and an S pole may be sequentially provided on one surface of the first magnet 3110 facing the first coil 3130 in the first axis (the X-axis) direction. The first magnet 3110 has a length in the second axis (the Y-axis) direction (refer to FIG. 4).

The other surface (e.g., an opposite surface of the one surface) of the first magnet 3110 may be magnetized to have both an S pole and an N pole. For example, an S pole, a neutral region, and an N pole may be sequentially provided on the other surface of the first magnet 3110 in the first axis (the X-axis) direction.

All magnetization directions of polarities of the plurality of magnets included in the first magnet 3110 may be the same.

The first coil 3130 is disposed to face the first magnet 3110. For example, the first coil 3130 may be disposed to face the first magnet 3110 in the optical axis (the Z-axis) direction.

The first coil 3130 has a hollow donut shape and has a length in the second axis (the Y-axis) direction. The first coil 3130 includes a smaller number of coils than the number of magnets included in the first magnet 3110. For example, the first coil 3130 may include two coils spaced apart from each other in a direction (the first axis (the X-axis) direction) in which driving force is generated, and each coil may be arranged to face the magnets of each set.

During OIS, the first magnet 3110 is a fixed member fixed to the fixed frame 1000, and the first coil 3130 is a moving member mounted on the movable frame 2000 and moving together with the movable frame 2000.

When power is applied to the first coil 3130, the movable frame 2000 may be moved in the first axis (the X-axis) direction by electromagnetic force between the first magnet 3110 and the first coil 3130.

The first magnet 3110 and the first coil 3130 may generate driving force in a direction (e.g., the first axis (the X-axis) direction), perpendicular to a direction (the optical axis (the Z-axis) direction) in which the first magnet 3110 and the first coil 3130 face each other.

The second sub-driving unit 3300 includes a second magnet 3310 and a second coil 3330. The second magnet 3310 and the second coil 3330 may face each other in the optical axis (the Z-axis) direction.

The second magnet 3310 is disposed on the fixed frame 1000. The second magnet 3310 may include a plurality of magnets. For example, the second magnet 3310 may include two magnets, and the two magnets may be spaced apart from each other in the first axis (the X-axis) direction. For example, the second magnet 3310 may include two magnets spaced apart from each other in a direction, perpendicular to a direction (the second axis (the Y-axis) direction) in which driving force is generated by the second magnet 3310.

The fixed frame 1000 may have a mounting recess in which the second magnet 3310 is disposed. By disposing the second magnet 3310 in the mounting recess, it is possible to prevent the overall height of the first actuator 10 and the camera module 1 from increasing due to a thickness of the second magnet 3310.

The second magnet 3310 may be magnetized so that one surface (e.g., a surface facing the second coil 3330) has both an S pole and an N pole. For example, an S pole, a neutral region, and an N pole may be sequentially provided on one surface of the second magnet 3310 facing the second coil 3330 in the second axis (the Y-axis) direction (refer to FIG. 4). The second magnet 3310 has a length in the first axis (the X-axis) direction.

The other surface (e.g., the opposite surface of the one surface) of the second magnet 3310 may be magnetized to have both an N pole and an S pole. For example, an N pole, a neutral region, and an S pole may be sequentially provided on the other surface of the second magnet 3310 in the second axis (the Y-axis) direction.

The magnetization directions of the two magnets of the second magnet 3310 may be opposite to each other.

The second coil 3330 is disposed to face the second magnet 3310. For example, the second coil 3330 may be disposed to face the second magnet 3310 in the optical axis (the Z-axis) direction.

The second coil 3330 has a hollow doughnut shape and has a length in the first axis (the X-axis) direction. The second coil 3330 includes the number of coils corresponding to the number of magnets included in the second magnet 3310.

During OIS, the second magnet 3310 is a fixed member fixed to the fixed frame 1000, and the second coil 3330 is a moving member mounted on the movable frame 2000 and moving together with the movable frame 2000.

When power is applied to the second coil 3330, the movable frame 2000 may be moved in the second axis (the Y-axis) direction by electromagnetic force between the second magnet 3310 and the second coil 3330.

The second magnet 3310 and the second coil 3330 may generate driving force in a direction (e.g., the second axis (the Y-axis) direction), perpendicular to a direction (the optical axis (the Z-axis) direction) in which the second magnet 3310 and the second coil 3330 face each other.

The movable frame 2000 may be rotated by the first sub-driving unit 3100 and the second sub-driving unit 3300.

For example, rotational force may be generated by controlling driving force of the first sub-driving unit 3100 and driving force of the second sub-driving unit 3300, and accordingly, the movable frame 2000 may be rotated.

The first magnet 3110 and the second magnet 3310 are disposed to be perpendicular to each other in a plane, perpendicular to the optical axis (the Z-axis), and the first coil 3130 and the second coil 3330 are also disposed to be perpendicular to each other in a plane perpendicular to the optical axis (the Z-axis).

The first ball member B1 is disposed between the fixed frame 1000 and the movable frame 2000.

The first ball member B1 is disposed to contact each of the fixed frame 1000 and the movable frame 2000.

The first ball member B1 functions to guide movement of the movable frame 2000 in the OIS process. In addition, the first ball member B1 also functions to maintain a distance between the fixed frame 1000 and the movable frame 2000.

The first ball member B1 rolls in the first axis (the X-axis) direction when driving force is generated in the first axis (the X-axis) direction. Accordingly, the first ball member B1 guides the movement of the movable frame 2000 in the first axis (the X-axis) direction.

In addition, the first ball member B1 rolls in the second axis (the Y-axis) direction when driving force is generated in the second axis (the Y-axis) direction. Accordingly, the first ball member B1 guides the movement of the movable frame 2000 in the second axis (the Y-axis) direction.

The first ball member B1 includes a plurality of balls disposed between the fixed frame 1000 and the movable frame 2000.

At least one of the surfaces of the fixed frame 1000 and the movable frame 2000 facing each other in the optical axis (the Z-axis) direction is provided with a guide recess in which the first ball member B1 is disposed. A plurality of guide recesses are provided to correspond to the plurality of balls of the first ball member B1.

For example, a first guide recess may be provided on a lower surface of the fixed frame 1000, and a second guide recess 2100 may be provided on an upper surface of the movable frame 2000.

The first ball member B1 is disposed in the first guide recess and the second guide recess 2100 and is inserted between the fixed frame 1000 and the movable frame 2000.

Each of the first guide recess and the second guide recess 2100 may have a polygonal or circular planar shape. A size of the first guide recess and the second guide recess 2100 is greater than a diameter of the first ball member B1. For example, a cross-section of the first guide recess and the second guide recess 2100 on a plane, perpendicular to the optical axis (the Z-axis), may have a size larger than the diameter of the first ball member B1.

A specific shape of the first guide recess and the second guide recess 2100 is not limited as long as the size of the first guide recess and the second guide recess 2100 is greater than the diameter of the first ball member B1.

Accordingly, the first ball member B1 may roll in a direction, perpendicular to the optical axis (the Z-axis), while being accommodated in the first guide recess and the second guide recess 2100.

Support pads 1600 and 2930 may be provided in the fixed frame 1000 and the movable frame 2000, respectively, and at least a portion of the support pads 1600 and 2930 may form a bottom surface of the first guide recess and the second guide recess 2100. Accordingly, the first ball member B1 may roll in contact with the support pads 1600 and 2930.

The support pads 1600 and 2930 may be integrally coupled to the fixed frame 1000 and the movable frame 2000 by insert-injection. In this case, the support pads 1600 and 2930 may be manufactured to be integrated with the fixed frame 1000 and the movable frame 2000 by injecting a resin material into a mold while the support pads 1600 and 2930 are fixed in the mold.

The support pads 1600 and 2930 may be formed of a non-magnetic metal (e.g., stainless steel) material.

When driving force is generated in the first axis (the X-axis) direction, the movable frame 2000 is moved in the first axis (the X-axis) direction.

In addition, when driving force is generated in the second axis (the Y-axis) direction, the movable frame 2000 is moved in the second axis (the Y-axis) direction.

In addition, the movable frame 2000 may be rotated by generating a deviation between the driving force in the first axis (the X-axis) direction and the driving force in the second axis (the Y-axis) direction.

Since a portion of the sensor substrate 4000 is coupled to the movable frame 2000 and the image sensor S is disposed on the sensor substrate 4000, as the movable frame 2000 is moved or rotated, the image sensor S may be moved or rotated.

Referring to FIG. 2, a protrusion 2400 protruding toward the sensor substrate 4000 may be disposed on the movable frame 2000. For example, the protrusion 2400 may be disposed on a lower surface of the movable frame 2000, and the protrusion 2400 may be coupled to a moving portion 4100 of the sensor substrate 4000. Therefore, a gap is formed in the optical axis (the Z-axis) direction between a body of the movable frame 2000 and the sensor substrate 4000, and accordingly, the movable frame 2000 may be prevented from being interfered with the sensor substrate 4000 when moving on an X-Y plane.

Although the protrusion 2400 is disposed on a lower surface of the movable frame 2000 in FIG. 2, this is only an example and the protrusion 2400 may also be disposed on an upper surface of the sensor substrate 4000.

The first actuator 10 may detect a position of the movable frame 2000 in a direction, perpendicular to the optical axis (the Z-axis).

To this end, a first position sensor 3150 and a second position sensor 3350 are provided.

The first position sensor 3150 is disposed on the movable frame 2000 to face the first magnet 3110, and the second position sensor 3350 is disposed on the movable frame 2000 to face the second magnet 3310. The first position sensor 3150 and the second position sensor 3350 may be Hall sensors.

The second position sensor 3350 may include two Hall sensors. For example, the second magnet 3310 includes two magnets spaced apart from each other in a direction (the first axis (the X-axis) direction), perpendicular to a direction (the second axis (the Y-axis) direction) in which driving force is generated by the second magnet 3310, and the second position sensor 3350 includes two Hall sensors disposed to face the two magnets.

Whether the movable frame 2000 is rotated may be detected through two Hall sensors facing the second magnet 3310.

Rotational force may be intentionally generated by a method such as generating a deviation between driving force of the first sub-driving unit 3100 and driving force of the second sub-driving unit 3300, using a resultant force of the first sub-driving unit 3100 and the second sub-driving unit 3300, or using two magnets and two coils included in the second sub-driving unit 3300.

Since the first guide recess and the second guide recess 2100 have a polygonal or circular shape larger than a diameter of the first ball member B1, the ball member B1 disposed between the first guide recess and the second guide recess 2100 may roll in a direction, perpendicular to the optical axis (the Z-axis), without restriction.

Accordingly, the movable frame 2000 may be rotated based on the Z axis, while being supported by the first ball member B1.

In addition, when rotation is not required and linear movement is required, unintentionally generated rotational force may be canceled out by controlling driving force of the first sub-driving unit 3100 and/or driving force of the second sub-driving unit 3300.

Figure 5:
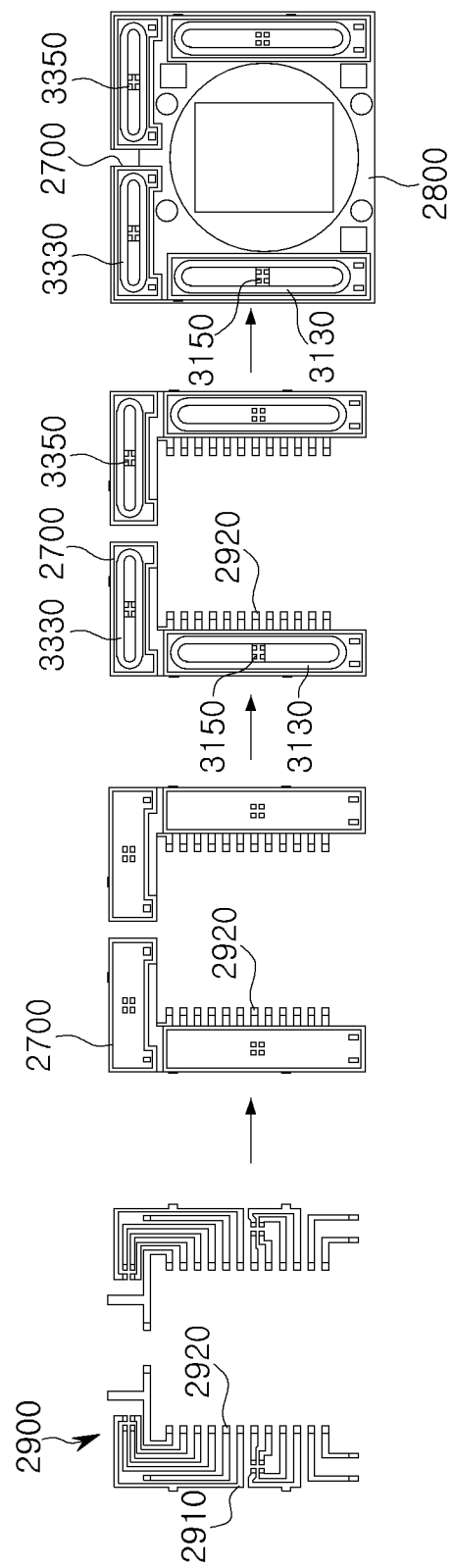
FIG. 5 is a diagram illustrating a manufacturing process of a movable frame according to an example embodiment in the present disclosure.
Figure 6:
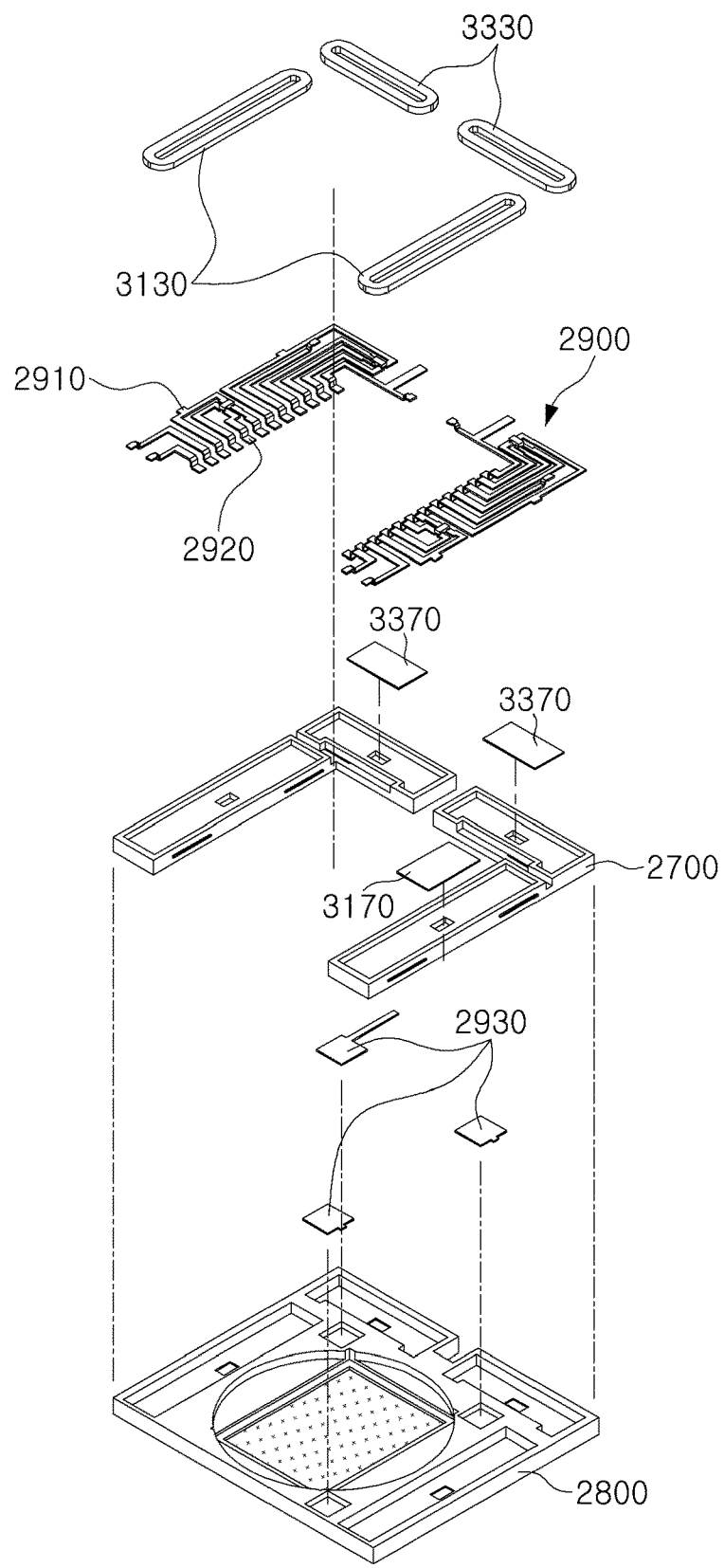
FIG. 6 is an exploded perspective view of a movable frame according to an example embodiment in the present disclosure.
Figure 7:
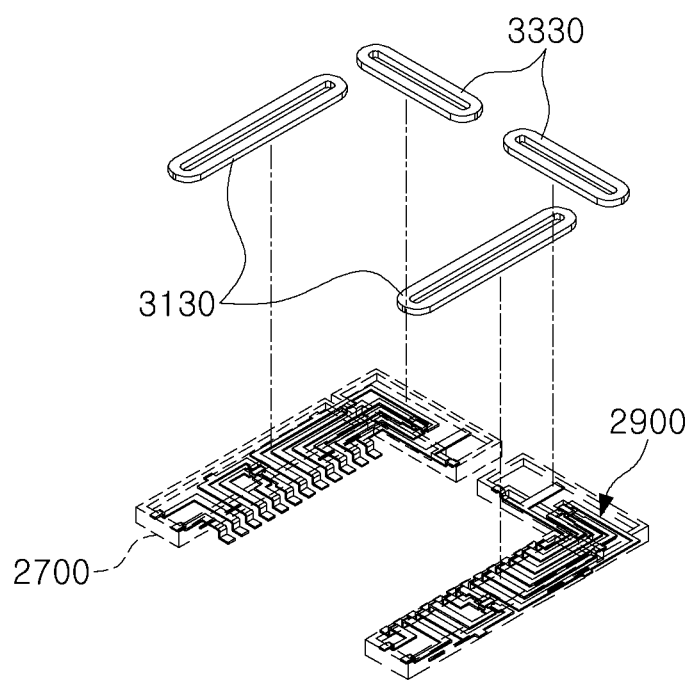
FIGS. 7 and 8 are partially exploded perspective views of a movable frame according to an example embodiment in the present disclosure.
Figure 8:
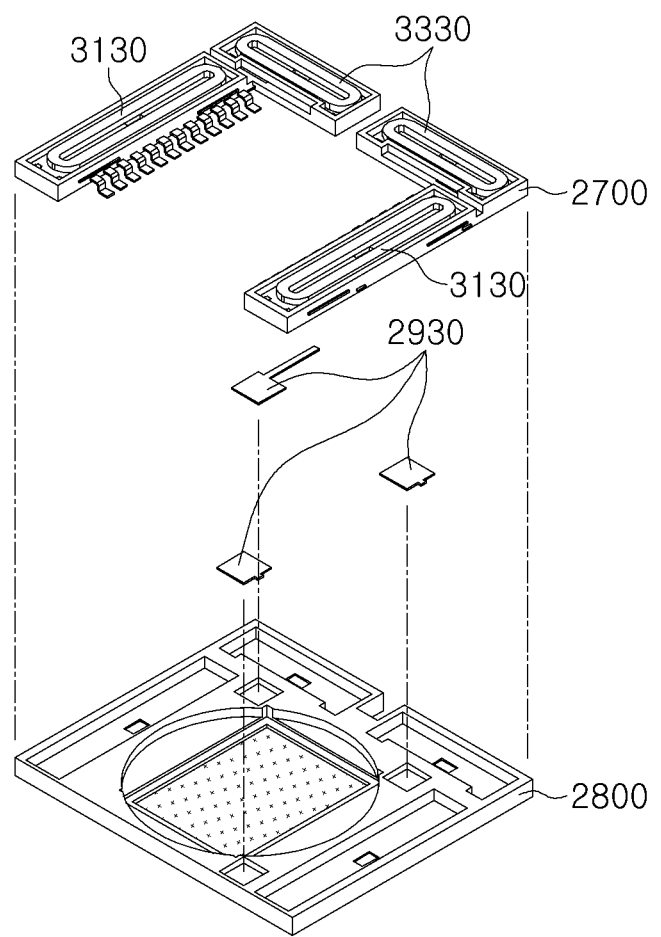

FIG. 5 is a view illustrating a manufacturing process of a movable frame according to an example embodiment in the present disclosure, FIG. 6 is an exploded perspective view of a movable frame according to an example embodiment in the present disclosure, and FIGS. 7 and 8 are partially exploded perspective views of a movable frame according to an example embodiment in the present disclosure.

Figure 9:
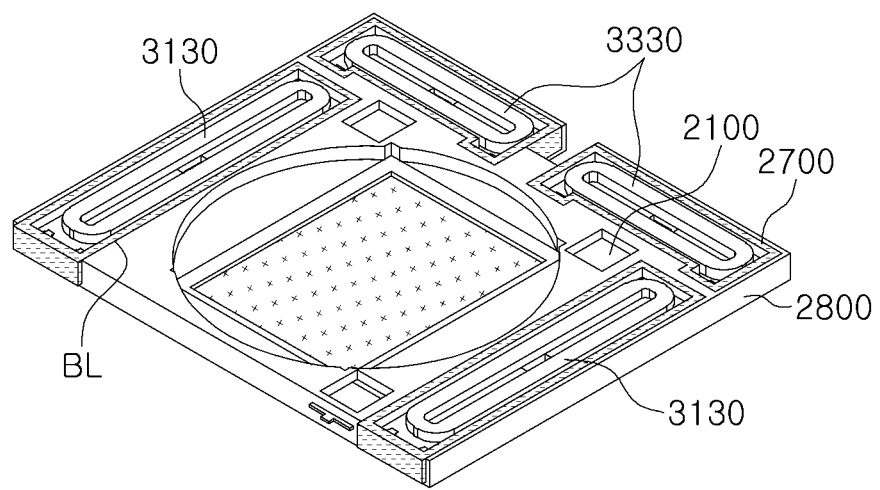
FIG. 9 is a perspective view of a movable frame according to an example embodiment in the present disclosure.
Figure 10:
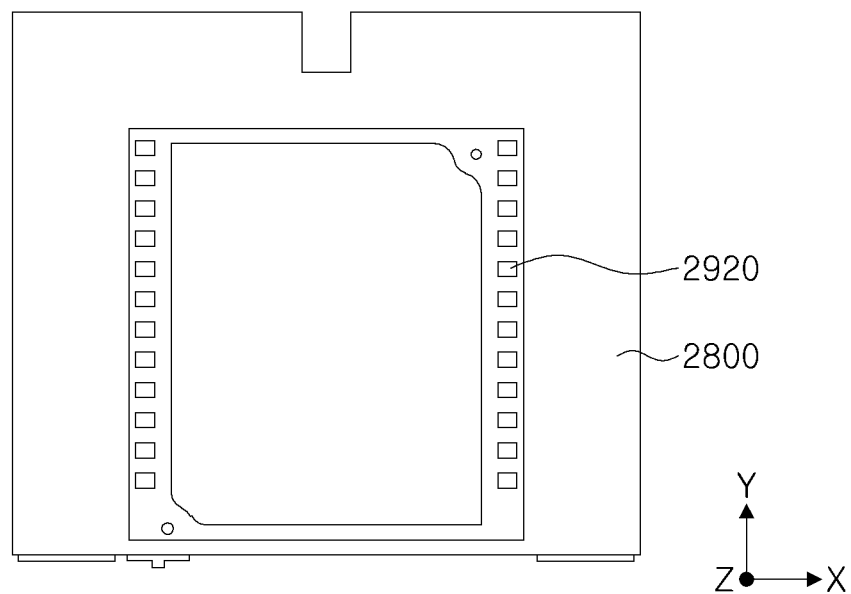
FIG. 10 is a bottom view of a movable frame according to an example embodiment in the present disclosure.

Also, FIG. 9 is a perspective view of a movable frame according to an example embodiment in the present disclosure, and FIG. 10 is a bottom view of a movable frame according to an example embodiment in the present disclosure.

Referring to FIGS. 5 to 10, the first coil 3130 and the second coil 3330 are disposed in the movable frame 2000, and a wiring pattern 2900 is disposed inside the movable frame 2000. The wiring pattern 2900 may be connected to the first coil 3130 and the second coil 3330. Also, the wiring pattern 2900 of the movable frame 2000 may be connected to the sensor substrate 4000. Accordingly, the first coil 3130 and the second coil 3330 may receive power through the wiring pattern 2900 disposed in the movable frame 2000.

That is, instead of disposing a separate printed circuit board (PCB) for supplying power to the first driving unit 3000 in the movable frame 2000, the movable frame 2000 itself is provided with the wiring pattern 2900 to supply power to the first driving unit 3000.

The wiring pattern 2900 may be integrally coupled to the movable frame 2000 by insert-injection. For example, the wiring pattern 2900 may be manufactured to be integrated with the movable frame 2000 by injecting a resin material into a mold while the wiring pattern 2900 is disposed in the mold.

In the process of manufacturing the movable frame 2000, injection may be performed at least twice.

If a pattern width of the wiring pattern 2900 is minimized to reduce the size, rigidity of the wiring pattern 2900 may not be sufficient and it may be difficult to fix a position of the wiring pattern 2900 during insert-injection molding.

Therefore, the movable frame 2000 having the wiring pattern 2900 therein may be manufactured by manufacturing a first injection-molded product (e.g., the first frame 2700) integrated with the wiring pattern 2900 by insert-injection and then manufacturing a second injection-molded product (e.g., the second frame 2800) integrated with the first injection-molded product by insert-injecting the first injection-molded product.

Since injection is performed at least twice, a boundary line BL is formed between the first frame 2700, which is the first injection-molded product, and the second frame 2800, which is the second injection-molded product.

Each of the first frame 2700 and the second frame 2800 is formed of a plastic material. Also, the plastic material of the first frame 2700 and the plastic material of the second frame 2800 may be the same or different.

The wiring pattern 2900 may be disposed inside the first frame 2700 and inside the second frame 2800, and a portion of the wiring pattern 2900 may be exposed externally of the first frame 2700, and another portion of the wiring pattern 2900 may be exposed externally of the second frame 2800. The portion of the wiring pattern 2900 exposed externally of the first frame 2700 may be connected to the first coil 3130 and the second coil 3330, and the portion of the wiring pattern 2900 exposed externally of the second frame 2800 may be connected to the sensor substrate 4000.

The first coil 3130, the second coil 3330, the first position sensor 3150, and the second position sensor 3350 are mounted on the first frame 2700, which is the first injection-molded product. The first coil 3130, the second coil 3330, the first position sensor 3150, and the second position sensor 3350 are connected to the wiring pattern 2900 provided on the first frame 2700.

The wiring pattern 2900 includes a wiring portion 2910 and a terminal portion 2920.

A portion of the wiring portion 2910 is exposed to an upper surface of the movable frame 2000, and the other portion of the wiring portion 2910 is disposed inside the movable frame 2000. Also, the terminal portion 2920 is exposed to a lower surface of the movable frame 2000.

For example, a portion of the wiring portion 2910 may be exposed to an upper surface of the first frame 2700 and the other portion is located inside the first frame 2700. In addition, the other portion of the wiring portion 2910 may extend to be located inside the second frame 2800.

The terminal portion 2920 is disposed to be exposed externally of the first frame 2700. Also, the terminal portion 2920 is disposed to be exposed externally of the second frame 2800.

Since the terminal portion 2920 of the wiring pattern 2900 is connected to the sensor substrate 4000, power may be applied to the first coil 3130 and the second coil 3330 through the wiring pattern 2900.

The second frame 2800 includes a second guide recess 2100 in which the first ball member B1 is disposed. Since a material of the first ball member B1 may be ceramics and a material of the second frame 2800 is plastic, the second guide recess 2100 may be damaged due to a difference in rigidity.

Therefore, in order to prevent damage to the second guide recess 2100, a support pad 2930 is disposed in the second guide recess 2100, and the support pad 2930 may be insert-injected in the second injection molding process to be integrated with the second frame 2800.

The support pad 2930 is disposed inside the second frame 2800, and one surface of the support pad 2930 is exposed externally of the second frame 2800 to contact the first ball member B1.

The support pad 2930 may be formed of a non-magnetic metal (e.g., stainless steel) material.

The support pad 2930 may form a bottom surface of the second guide recess 2100. Accordingly, the first ball member B1 may roll in contact with the support pad 2930.

A first yoke 3170 and a second yoke 3370 are disposed inside the movable frame 2000. The first yoke 3170 and the second yoke 3370 provide attractive force so that the fixed frame 1000 and the movable frame 2000 may be maintained in contact with the first ball member B1.

The first yoke 3170 and the second yoke 3370 may be insert-injected and integrated with the first frame 2700, like the wiring pattern 2900 in the first injection molding process.

The first yoke 3170 and the second yoke 3370 are disposed to face the first magnet 3110 and the second magnet 3310 in the optical axis (the Z-axis) direction.

The first coil 3130 and the wiring pattern 2900 may be located between the first magnet 3110 and the first yoke 3170, and the second coil 3330 and the wiring pattern 2900 may be located between the second magnet 3310 and the second yoke 3370.

At least a portion of each of the first yoke 3170 and the second yoke 3370 may be disposed inside the first frame 2700.

Attractive force acts between the first yoke 3170 and the first magnet 3110 and between the second yoke 3370 and the second magnet 3310 in the optical axis (the Z-axis) direction.

Therefore, since the movable frame 2000 is pressed in a direction toward the fixed frame 1000, the fixed frame 1000 and the movable frame 2000 may be maintained in contact with the first ball member B1.

The first yoke 3170 and the second yoke 3370 are formed of a material capable of generating attractive force between the first magnet 3110 and the second magnet 3310. For example, the first yoke 3170 and the second yoke 3370 are provided as magnetic members.

The number of the first yoke 3170 and the second yoke 3370 is not particularly limited, but a center point of the action of attractive force acting between the first magnet 3110 and the second magnet 3310 and between the first yoke 3170 and the second yoke 3370 should be located within a support region formed by connecting a plurality of balls included in the first ball member B1.

Figure 11:
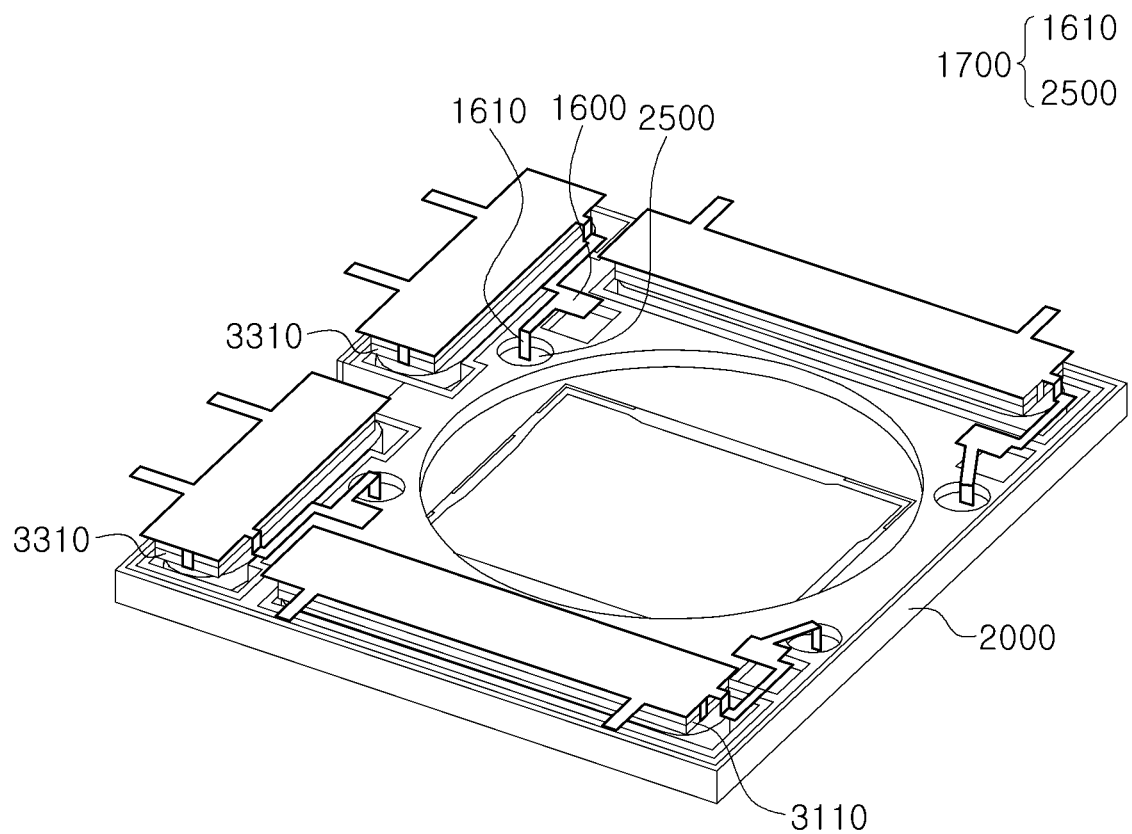
FIGS. 11 and 12 are diagrams illustrating a damping unit of a first actuator according to an example embodiment in the present disclosure.
Figure 12:
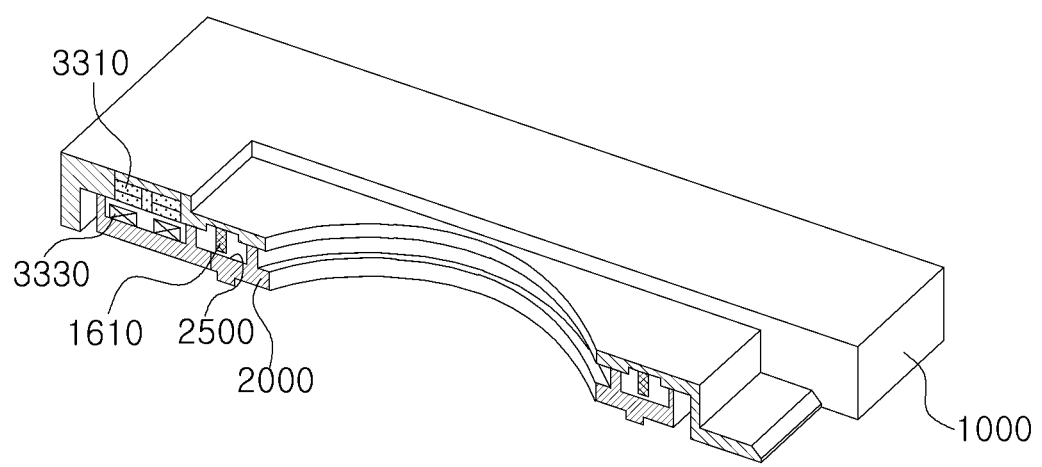

FIGS. 11 and 12 are diagrams illustrating a damping unit of a first actuator according to an example embodiment in the present disclosure.

Referring to FIGS. 11 and 12, the first actuator 10 may include a damping unit 1700. The damping unit 1700 includes a plurality of damping recesses 2500, a plurality of damping pins 1610, and a damping gel.

A plurality of damping recesses 2500 may be disposed in the movable frame 2000. For example, the plurality of damping recesses 2500 may be formed on an upper surface of the movable frame 2000. Also, the plurality of damping recesses 2500 may be disposed to be adjacent to the plurality of second guide recesses 2100. The plurality of damping recesses 2500 are disposed in the second frame 2800 constituting the movable frame 2000.

The fixed frame 1000 may include the plurality of damping pins 1610 extending toward the plurality of damping recesses 2500.

At least a portion of the damping pin 1610 extending from the fixed frame 1000 may be accommodated in each damping recess 2500. For example, the plurality of damping pins 1610 protruding from the fixed frame 1000 may be disposed in the fixed frame 1000 to extend in the optical axis (the Z-axis) direction, and at least a portion of each damping pin 1610 may be disposed in each damping recess 2500 of the movable frame 2000.

Also, a damping gel may be disposed in the plurality of damping recesses 2500. Also, a portion of the damping pin 1610 is disposed within the damping gel.

During OIS, the movable frame 2000 is a moving member and the fixed frame 1000 is a fixed member, so that the damping recess 2500 may move relative to the damping pin 1610. In addition, since the damping pin 1610 is contained in the damping gel, resistance may be generated by the damping gel when the damping recess 2500 moves. Accordingly, the damping structure may be easily implemented.

Figure 13:
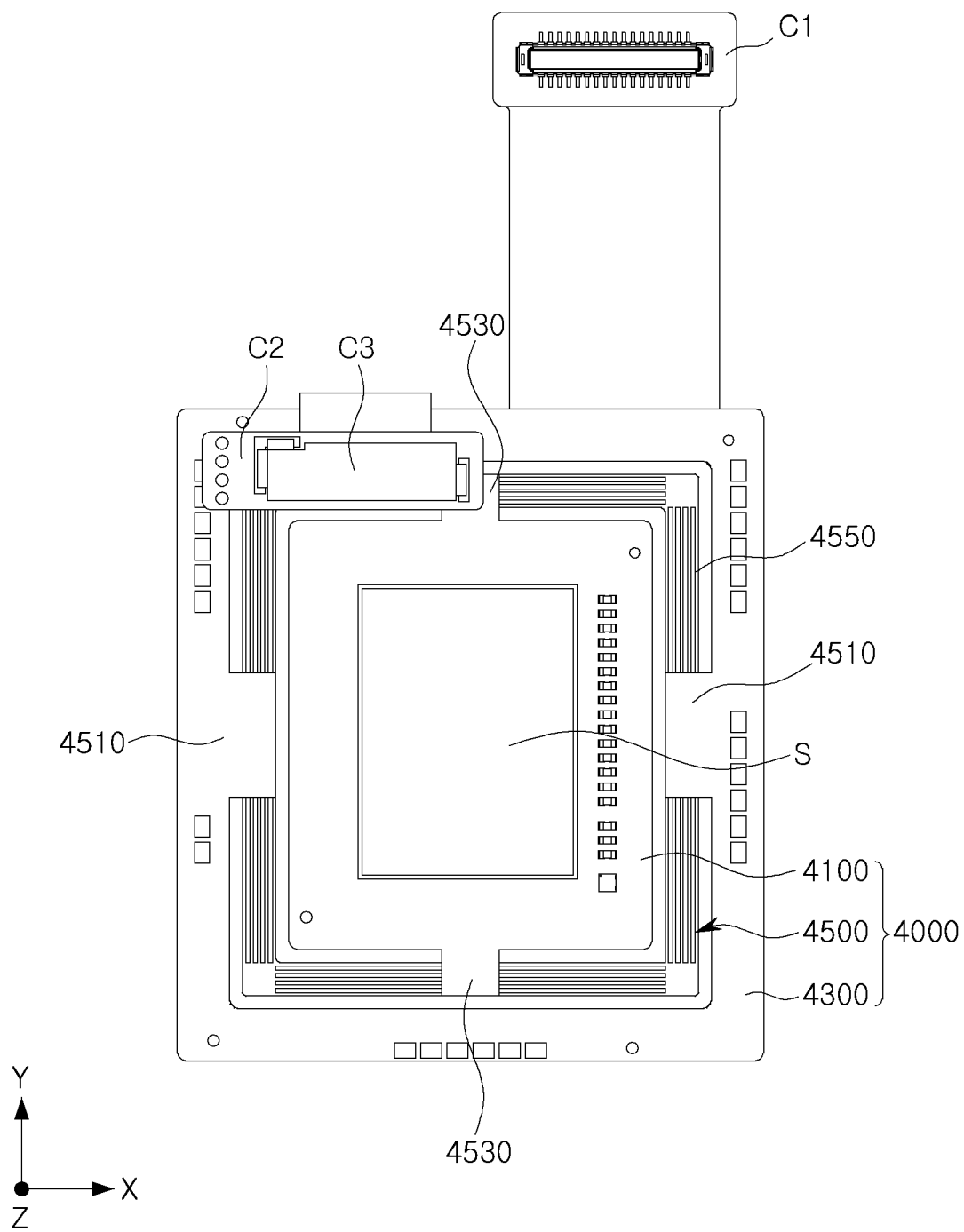
FIGS. 13 and 14 are plan views of a sensor substrate of a first actuator according to an example embodiment in the present disclosure.
Figure 14:
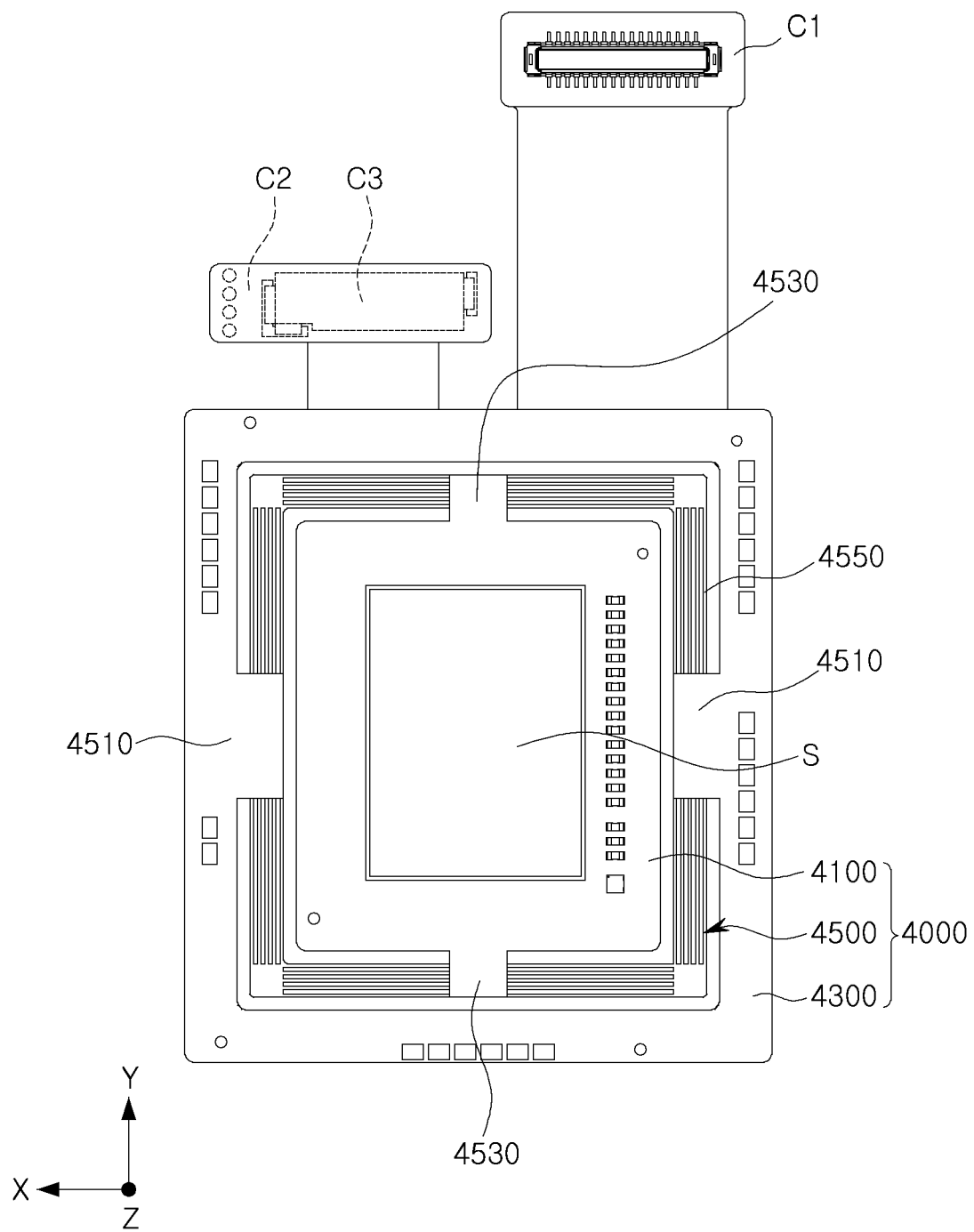

FIGS. 13 and 14 are plan views of a sensor substrate of a first actuator according to an example embodiment in the present disclosure.

Referring to FIGS. 13 and 14, the sensor substrate 4000 includes a moving portion 4100, a fixed portion 4300 and a connection portion 4500. The sensor substrate 4000 may be an RF PCB.

The image sensor S is mounted on the moving portion 4100. The moving portion 4100 is coupled to a lower surface of the movable frame 2000. For example, an area of the moving portion 4100 is larger than that of the image sensor S, and the moving portion 4100 at an outer portion of the image sensor S may be coupled to the lower surface of the movable frame 2000.

The moving portion 4100 is a moving member moving together with the movable frame 2000 during OIS. The moving portion 4100 may be a rigid PCB.

The fixed portion 4300 is coupled to a lower surface of the fixed frame 1000. The fixed portion 4300 is a fixed member that does not move during OIS. The fixed portion 4300 may be a rigid PCB.

The connection portion 4500 may be disposed between the moving portion 4100 and the fixed portion 4300, and may connect the moving portion 4100 to the fixed portion 4300. The connection portion 4500 may be a flexible PCB. When the moving portion 4100 is moved, the connection portion 4500 disposed between the moving portion 4100 and the fixed portion 4300 may be bent.

The connection portion 4500 extends along the circumference of the moving portion 4100. The connection portion 4500 is provided with a plurality of slits passing through the connection portion 4500 in the optical axis direction. The plurality of slits are disposed at intervals between the moving portion 4100 and the fixed portion 4300. Accordingly, the connection portion 4500 may include a plurality of bridge elements 4550 spaced apart from each other by the plurality of slits. The plurality of bridge elements 4550 extend along the circumference of the moving portion 4100. Each bridge element may have a width thinner than a thickness thereof.

The connection portion 4500 includes a first support portion 4510 and a second support portion 4530. The connection portion 4500 is connected to the fixed portion 4300 through the first support portion 4510. Also, the connection portion 450 is connected to the moving portion 4100 through the second support portion 4530.

For example, the first support portion 4510 is in contact with and connected to the fixed portion 4300 and spaced apart from the moving portion 4100. Also, the second support portion 4530 is in contact with and connected to the moving portion 4100 and is spaced apart from the fixed portion 4300.

For example, the first support portion 4510 may extend in the first axial direction (the X-axis direction) to connect the plurality of bridges 4550 of the connection portion 4500 to the fixed portion 4300. In an example embodiment, the first support portion 4510 may include two support portions disposed opposite to each other in the first axial direction (the X-axis direction).

The second support portion 4530 may extend in the second axis direction (the Y-axis direction) to connect the plurality of bridges 4550 of the connection portion 4500 to the moving portion 4100. In an example embodiment, the second support portion 4530 may include two support portions disposed opposite to each other in the second axis direction (the Y-axis direction).

Accordingly, the moving portion 4100 may be moved in a direction, perpendicular to the optical axis (the Z-axis), or rotated about the optical axis (the Z-axis), while being supported by the connection portion 4500.

In an example embodiment, when the image sensor S is moved in the first axial direction (the X-axis direction), the plurality of bridges 4550 connected to the first support portion 4510 may be bent. Also, when the image sensor S is moved in the second axis direction (the Y-axis direction), the plurality of bridges 4550 connected to the second support portion 4530 may be bent. Also, when the image sensor S is rotated, the plurality of bridges 4550 connected to the first support portion 4510 and the plurality of bridges 4550 connected to the second support portion 4530 may be bent together.

In an example embodiment, a length of the fixed portion 4300 in the first axis (the X-axis) direction and a length thereof in the second axis (the Y-axis) direction may be different. For example, the length of the fixed portion 4300 in the second axis (the Y-axis) direction may be longer than the length in the first axis (the X-axis) direction. In an example embodiment, the sensor substrate 4000 may have a rectangular shape as a whole.

In this type of sensor substrate 4000, if the length of the first support portion 4510 and the length of the second support portion 4530 are equal to each other, a load applied to the plurality of bridges 4550 connected to the first support portion 4510 and a load applied to the plurality of bridges 4550 connected to the second support portion 4530 may be different from, and thus, driving control may be difficult.

Therefore, by adjusting the length of the first support portion 4510 and the length of the second support portion 4530 to be different from each other, the length of the plurality of bridges 4550 extending from the first support portion 4510 in the second axis (the Y-axis) direction may be substantially the same as the length of the plurality of bridges 4550 extending in the first axis (the X-axis) direction from the second support portion 4530.

Here, the length of the first support portion 4510 may refer to a length thereof in the second axis (the Y-axis) direction, and the length of the second support portion 4530 may refer to a length thereof in the first axis (the X-axis) direction.

A driving unit integrated circuit (IC) C3 for driving control of the first driving unit 3000 may be disposed on the sensor substrate 4000. The driving unit IC C3 may be disposed in the connection board C2, and the connection board C2 may be connected to the fixed portion 4300 by a flexible printed circuit board (FPCB).

The driving unit IC C3 may be fixed to an upper surface of the fixed frame 1000. That is, since the FPCB may be bent, the connection board C2 on which the driving unit IC C3 is disposed may be disposed on the upper surface of the fixed frame 1000. Therefore, since there is no need to secure a separate installation space, the overall size of the camera module 1 may be reduced.

In addition, a first connector C1 to be connected to an external power source (e.g., a portable electronic device in which the camera module 1 is mounted) may be extended and disposed at the fixed portion 4300 of the sensor substrate 4000.

Referring to FIGS. 2 and 3, the base 5000 may be coupled to a lower portion of the sensor substrate 4000.

The base 5000 may be coupled to the sensor substrate 4000 to cover the lower portion of the sensor substrate 4000. The base 5000 may serve to prevent external foreign substances from entering through a gap between the moving portion 4100 and the fixed portion 4300 of the sensor substrate 4000.

A heat dissipation film 5100 may be disposed below the base 5000, and the heat dissipation film 5100 may cover the lower portion of the base 5000 and a side surface of the first actuator 10.

For example, the heat dissipation film 5100 may cover the lower surface of the base 5000, and may further cover at least one of the side surface of the sensor substrate 4000 and the side surface of the fixed frame 1000, if necessary.

Therefore, heat generated by the image sensor S may be effectively dissipated.

Figure 15:
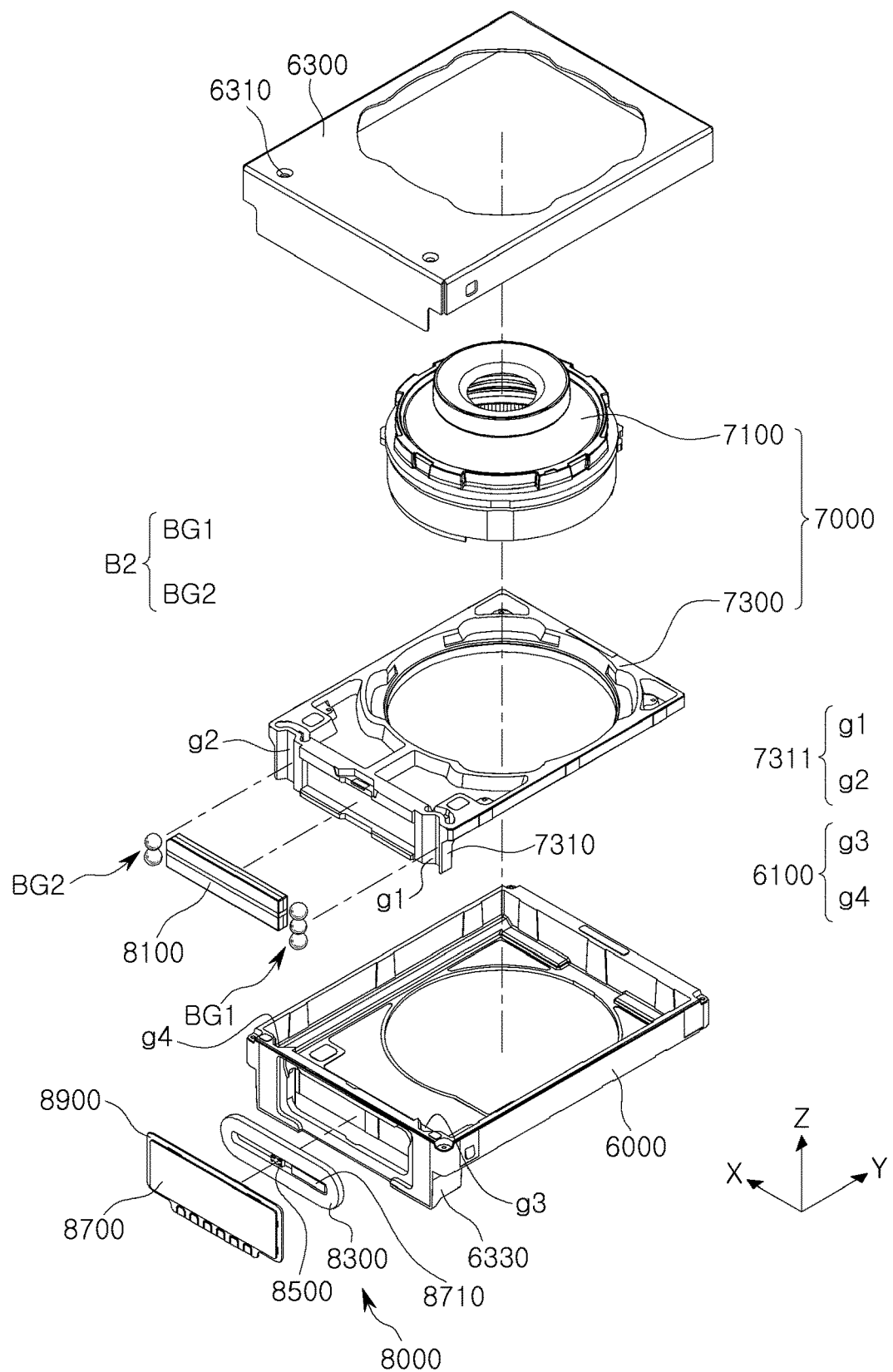
FIG. 15 is an exploded perspective view of a second actuator according to an example embodiment in the present disclosure.
Figure 16:
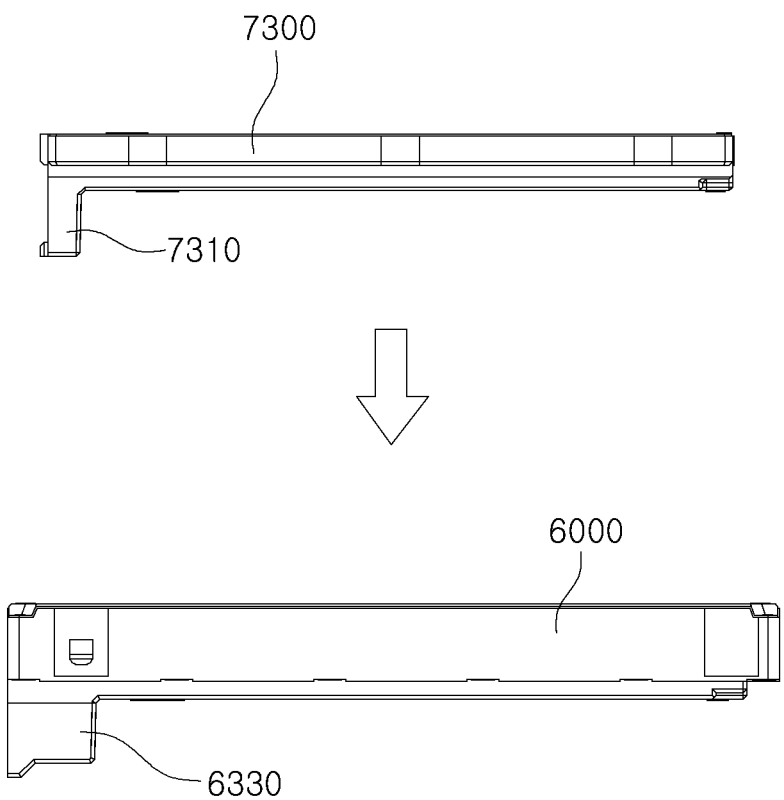
FIG. 16 is a side view of a carrier and a housing of a second actuator according to an example embodiment in the present disclosure.
Figure 17:
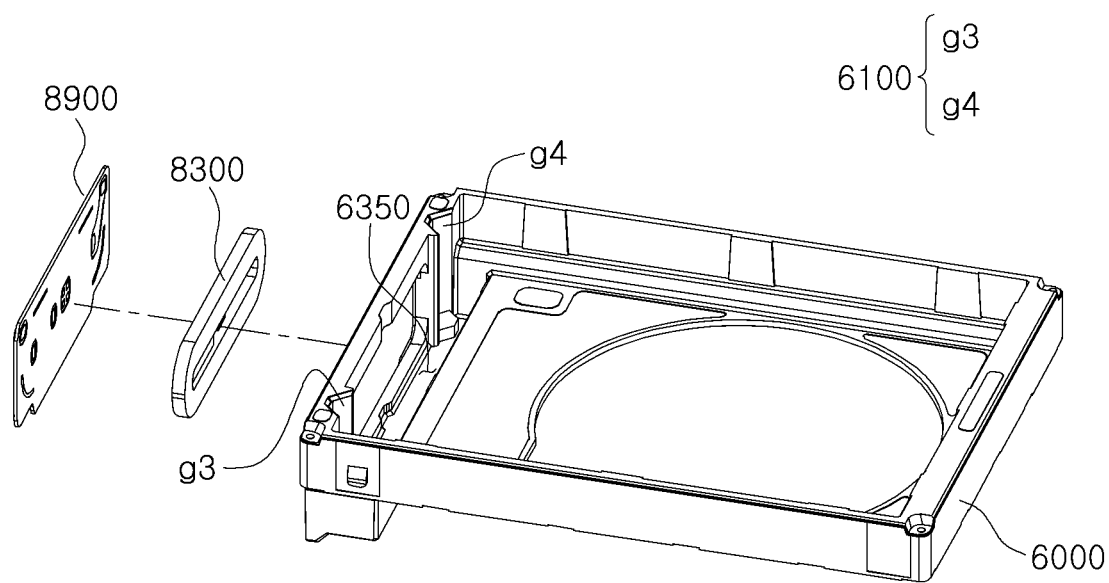
FIG. 17 is a perspective view of a housing of a second actuator according to an example embodiment in the present disclosure.

FIG. 15 is an exploded perspective view of a second actuator according to an example embodiment in the present disclosure, FIG. 16 is a side view of a carrier and a housing of the second actuator according to an example embodiment in the present disclosure, and FIG. 17 is a perspective view of a housing of the second actuator according to an example embodiment in the present disclosure.

Figure 18:
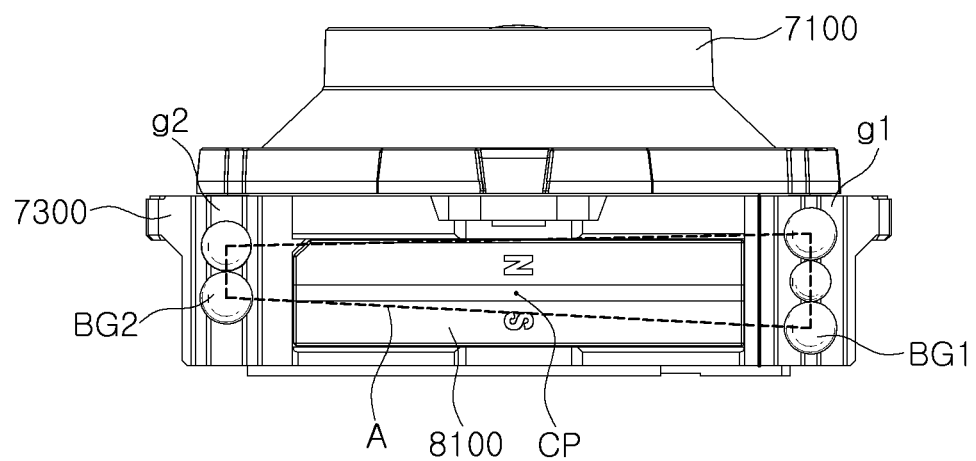
FIG. 18 is a front view of a carrier for a second actuator according to an example embodiment in the present disclosure.
Figure 19:
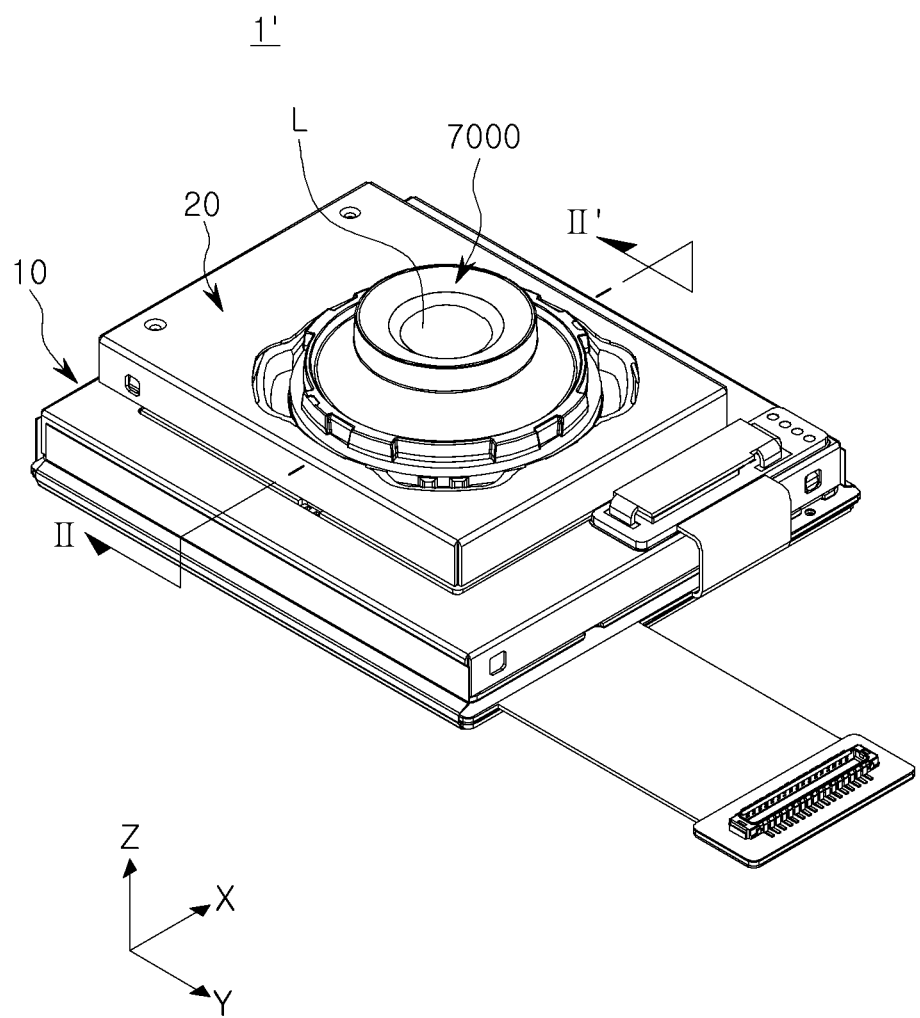
FIG. 19 is a perspective view of a camera module according to another example embodiment in the present disclosure.
Figure 20:
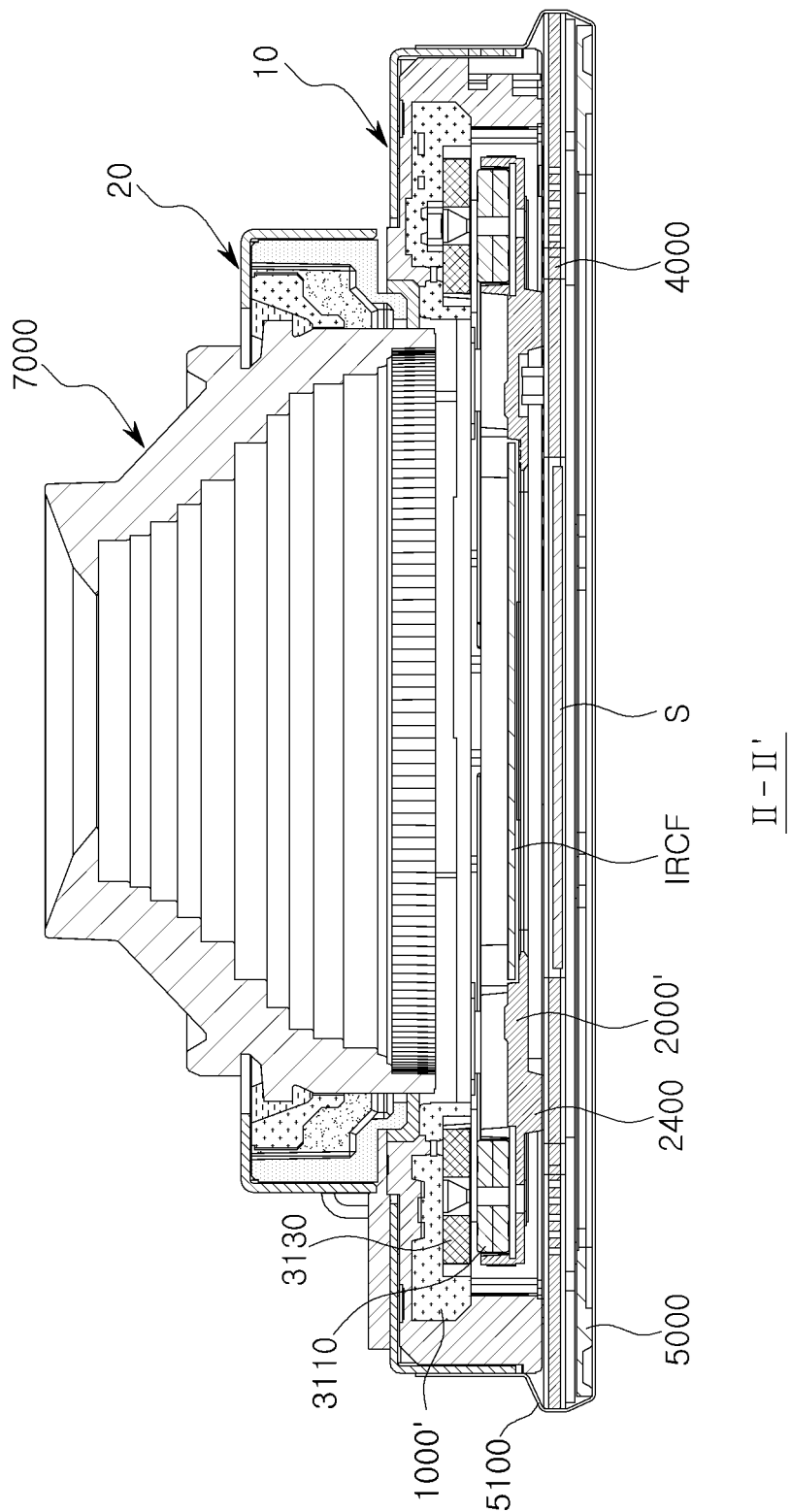
FIG. 20 is a cross-sectional view taken along line II-II' of FIG. 19.
Figure 21:
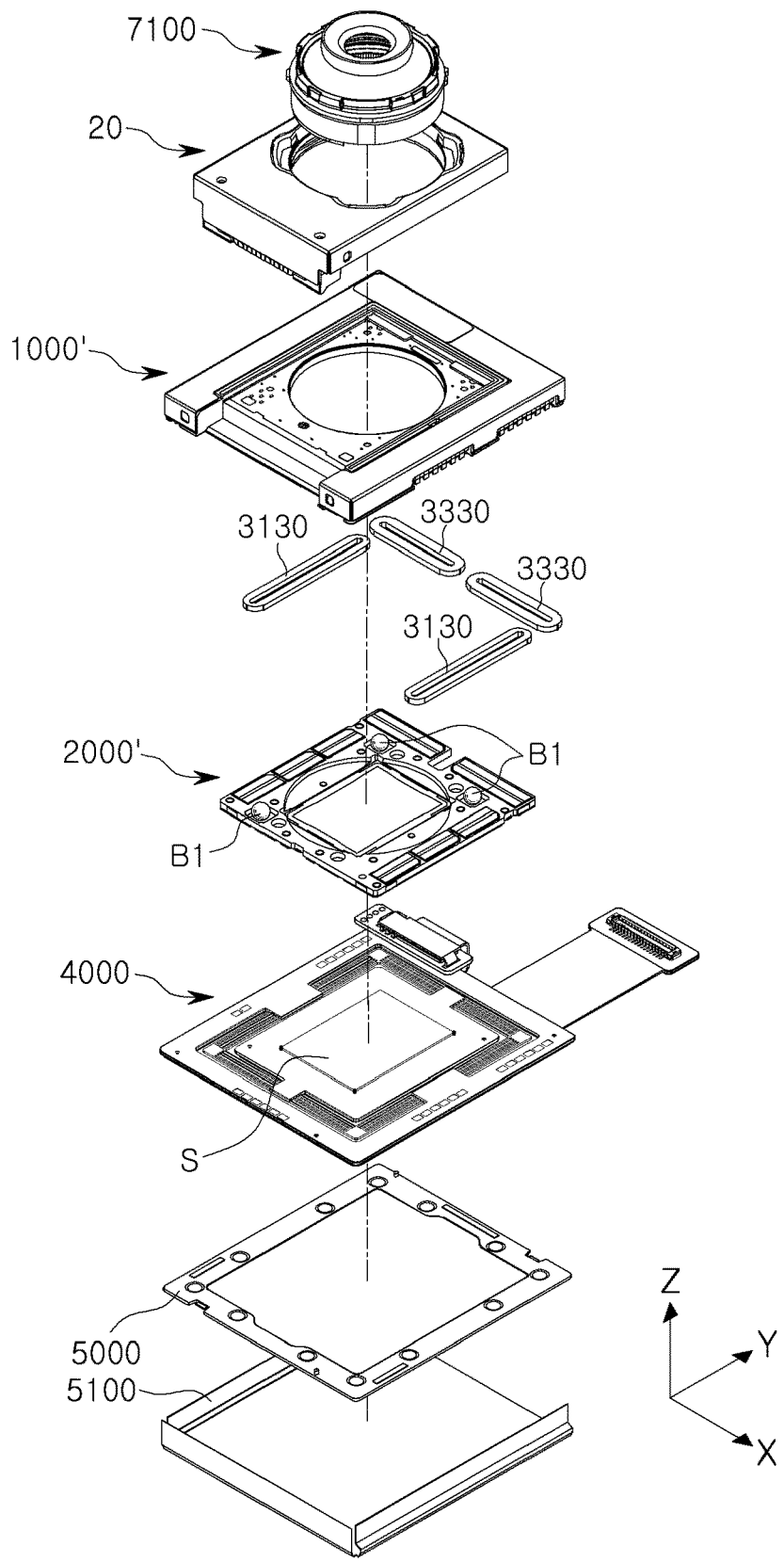
FIG. 21 is a schematic exploded perspective view of a camera module according to another example embodiment in the present disclosure.

Also, FIG. 18 is a front view of a carrier of a second actuator according to an example embodiment in the present disclosure.

Referring to FIGS. 15 to 18, the second actuator 20 may include the carrier 7300, the housing 6000, and a second driving unit 8000, and may further include a case 6300.

The carrier 7300 may include a hollow portion penetrating the carrier 7300 in the optical axis (the Z-axis) direction, and the lens barrel 7100 is inserted into the hollow portion and fixedly disposed with respect to the carrier 7300. Accordingly, the lens barrel 7100 and the carrier 7300 may be moved together in the optical axis (the Z-axis) direction.

The housing 6000 may have an internal space and may have a quadrangular box shape with open tops and bottoms. The carrier 7300 is disposed in the internal space of the housing 6000.

The case 6300 may be coupled to the housing 6000 to protect internal components of the second actuator 20.

The case 6300 may include a protruding portion 6310 protruding toward a second ball member B2 to be described below. The protrusion 6310 may serve as a stopper and a buffer member regulating a movement range of the second ball member B2.

The second driving unit 8000 may generate driving force in the optical axis (the Z-axis) direction to move the carrier 7300 in the optical axis (the Z-axis) direction.

The second driving unit 8000 includes a third magnet 8100 and a third coil 8300. The third magnet 8100 and the third coil 8300 may be disposed to face each other in a direction, perpendicular to the optical axis (the Z-axis).

The third magnet 8100 is disposed on the carrier 7300. For example, the third magnet 8100 may be disposed on one side of the carrier 7300.

One side of the carrier 7300 may protrude relative to other portions thereof in the optical axis (the Z-axis) direction. For example, the carrier 7300 may include a first guide portion 7310 protruding in an optical axis (the Z-axis) direction, and the third magnet 8100 may be disposed on the first guide portion 7310. Therefore, while securing an installation space for the second driving unit 8000 to secure driving force, a height of a second actuator 20' may be configured to be slim by reducing a height of other portions of the carrier 7300.

A back yoke may be disposed between the carrier 7300 and the third magnet 8100. The back yoke may improve driving force by preventing leakage of magnetic flux of the third magnet 8100.

The third magnet 8100 may be magnetized so that one side (e.g., the side facing the third coil 8300) has both an N pole and an S pole. For example, the N pole, a neutral region, and the S pole may be sequentially provided on one surface of the third magnet 8100 facing the third coil 8300 in the optical axis (the Z-axis) direction.

The other surface (e.g., the opposite surface of the one surface) of the third magnet 8100 may be magnetized to have both an S pole and an N pole. For example, the S pole, a neutral region, and the N pole may be sequentially provided on the other surface of the third magnet 8100 in the optical axis (the Z-axis) direction.

The third coil 8300 is disposed to face the third magnet 8100. For example, the third coil 8300 may be disposed to face the third magnet 8100 in a direction, perpendicular to the optical axis (the Z-axis).

The third coil 8300 is disposed on a substrate 8900, and the substrate 8900 is mounted on the housing 6000 such that the third magnet 8100 and the third coil 8300 face each other in a direction, perpendicular to the optical axis (the Z-axis).

One side of the housing 6000 may protrude relative to other portions of the housing in the optical axis (the Z-axis) direction. For example, the housing 6000 may include a second guide portion 6330 protruding in the optical axis (the Z-axis) direction, and the substrate 8900 may be mounted on the second guide portion 6330.

Also, as illustrated in FIG. 17, the second guide portion 6330 has an accommodation space 6350 for accommodating the first guide portion 7310.

Therefore, while securing an installation space for the second driving unit 8000 to secure driving force, a height of the second actuator 20 may be configured to be slim by reducing a height of the other portions of the housing 6000.

Since the first guide portion 7310 of the carrier 7300 and the second guide portion 6330 of the housing 6000 protrude in the optical axis (the Z-axis) direction, an escape region may be provided in the fixed frame 1000 of the first actuator 10 to secure an installation space of the first guide portion 7310 and the second guide portion 6330.

That is, as illustrated in FIG. 3, a step portion 1510 may be provided on one side of the fixed frame 1000, and the fixed frame 1000 may have an accommodation space in which the first guide portion 7310 and the second guide portion 6330 are disposed by the step portion 1510.

That is, an installation space of the first guide portion 7310 and the second guide portion 6330 may be secured by the step portion 1510.

Therefore, in the second actuator 20, even if the first guide portion 7310 of the carrier 7300 and the second guide portion 6330 of the housing 6000 protrude in the optical axis (the Z-axis) direction, since the protruding portion is disposed in the first actuator 10, the height of the entire camera module 1 may not be increased resultantly.

The third magnet 8100 is a moving member mounted on the carrier 7300 and moving in the optical axis (the Z-axis) direction together with the carrier 7300, and the third coil 8300 is a fixed member fixed to the substrate 8900.

When power is applied to the third coil 8300, the carrier 7300 may be moved in the optical axis (the Z-axis) direction by electromagnetic force between the third magnet 8100 and the third coil 8300.

Since the lens barrel 7100 is disposed in the carrier 7300, the lens barrel 7100 may also be moved in the optical axis (the Z-axis) direction by the movement of the carrier 7300.

The second ball member B2 is disposed between the carrier 7300 and the housing 6000. For example, the second ball member B2 may be disposed between the first guide portion 7310 of the carrier 7300 and the second guide portion 6330 of the housing 6000. The second ball member B2 includes a plurality of balls arranged in the optical axis (the Z-axis) direction. The plurality of balls may roll in the optical axis (the Z-axis) direction when the carrier 7300 is moved in the optical axis (the Z-axis) direction.

A yoke 8700 is disposed in the housing 6000. The yoke 8700 may be disposed in a position facing the third magnet 8100. For example, the third coil 8300 may be disposed on one surface of the substrate 8900 and the yoke 8700 may be disposed on the other surface of the substrate 8900.

The third magnet 8100 and the yoke 8700 may generate attractive force therebetween. For example, attractive force acts between the magnet 8100 and the yoke 8700 in a direction, perpendicular to the optical axis (the Z-axis).

The second ball member B2 may come into contact with the carrier 7300 and the housing 6000 by attractive force of the third magnet 8100 and the yoke 8700.

Guide recesses may be disposed on surfaces in which the carrier 7300 and the housing 6000 face each other. For example, a third guide recess 7311 may be provided in the first guide portion 7310 of the carrier 7300, and a fourth guide recess 6100 may be provided in the second guide portion of the housing 6000.

The third guide recess 7311 and the fourth guide recess 6100 extend in the optical axis (the Z-axis) direction. The second ball member B2 is disposed between the third guide recess 7311 and the fourth guide recess 6100.

The third guide recess 7311 includes a first recess g1 and a second recess g2, and the fourth guide recess 6100 includes a third recess g3 and a fourth recess g4. Each recess extends to have a length in the optical axis (the Z-axis) direction.

The first recess g1 and the third recess g3 are disposed to face each other in a direction, perpendicular to the optical axis (the Z-axis) direction, and a portion (e.g., the first ball group BG1 to be described below) of the plurality of balls of the second ball member B is disposed in a space between the first recess g1 and the third recess g3.

Among the plurality of balls included in the first ball group BG1, the outermost balls in a direction, parallel to the optical axis (the Z-axis) may be in two-point contact with each of the first recess g1 and the third recess g3.

That is, among the plurality of balls included in the first ball group BG1, the outermost balls in a direction, parallel to the optical axis (the Z-axis), are in two-point contact with the first recess g1 and two-point contact with the third recess g3.

The first ball group BG1, the first recess g1, and the third recess g3 may function as main guides for guiding movement of the lens module 7000 in the optical axis (the Z-axis) direction.

The second recess g2 and the fourth recess g4 are disposed to face each other in a direction, perpendicular to the optical axis (the Z-axis) direction, and a portion (e.g., the second ball group BG2 to be described below) is disposed in a space between the second recess g2 and the fourth recess g4.

Among the plurality of balls included in the second ball group BG2, the outermost balls in a direction, parallel to the optical axis (the Z-axis), are in two-point contact with any one of the second recess g2 and the fourth recess g4 and may be in one-point contact with the other.

For example, among the plurality of balls included in the second ball group BG2, the outermost balls in a direction, parallel to the optical axis (the Z-axis), may be in one-point contact with the second recess g2 and in two-point contact with the fourth recess g4 (and vice versa). The second ball group BG2, the second recess g2, and the fourth recess g4 may function as auxiliary guides supporting movement of the lens module 7000 in the optical axis (the Z-axis) direction.

The second ball member B2 includes a first ball group BG1 and a second ball group BG2, and the first ball group BG1 and the second ball group BG2 each include one or more balls arranged in the optical axis (the Z-axis) direction.

The first ball group BG1 and the second ball group BG2 are spaced apart from each other in a direction (e.g., X-axis direction), perpendicular to the optical axis (the Z-axis). The number of balls in the first ball group BG1 and the number of balls in the second ball group BG2 may be different from each other.

For example, the first ball group BG1 includes two or more balls arranged in the optical axis (the Z-axis) direction, and the second ball group BG2 includes the number of balls less than the number of balls included in the first ball group BG1.

The number of balls included in each ball member may be changed under the premise that the number of balls included in the first ball group BG1 and the number of balls included in the second ball group BG2 are different. Hereinafter, for convenience of description, an example embodiment in which the first ball group BG1 includes three balls and the second ball group BG2 includes two balls will be described.

Among the three balls included in the first ball group BG1, the two balls disposed at the outermost side in a direction, parallel to the optical axis (the Z-axis), have the same diameter as each other, and one ball disposed therebetween may have a diameter smaller than that of the balls disposed at the outermost side.

For example, among the plurality of balls included in the first ball group BG1, two balls disposed at the outermost side in a direction, parallel to the optical axis (the Z-axis), have a first diameter, and one ball disposed therebetween has a second diameter, and the first diameter is larger than the second diameter.

The two balls included in the second ball group BG2 may have the same diameter. For example, two balls included in the second ball group BG2 have a third diameter.

Also, the first diameter and the third diameter may be equal. Here, the diameters being equal may include diameters having an error in terms of manufacturing, as well as diameters being physically equal.

Among the plurality of balls included in the first ball group BG1, A distance between the centers of the outermost balls in a direction, parallel to the optical axis (the Z-axis), is different from a distance between the centers of the outermost balls in a direction, parallel to the optical axis (the Z-axis).

For example, the distance between the centers of two balls having a first diameter is greater than a distance between the centers of the two balls having a third diameter.

When the carrier 7300 is moved in the optical axis (the Z-axis) direction, a center point CP of the action of attractive force acting between the third magnet 8100 and the third yoke 8700 should be located in the support region A formed by connecting contact points between the second ball member B2 and the carrier 7300 (or the housing 6000) so that the carrier 7300 may be moved to be parallel to the optical axis (the Z-axis) direction (that is, to prevent the occurrence of a tilt).

If the center point CP of the action of attractive force deviates from the support region A, the position of the carrier 7300 is distorted when the carrier 7300 moves, which may cause a tilt. Therefore, it is necessary to form the support region A as wide as possible.

In an example embodiment in the present disclosure, a size (e.g., a diameter) of a portion of the plurality of balls of the second ball member B2 is formed to be smaller than a size (e.g., a diameter) of the other balls on purpose. In this case, larger balls, among the plurality of balls, may be intentionally brought into contact with the carrier 7300 or the housing 6000.

Since the diameter of two out of the three balls of the first ball group BG1 is larger than the diameter of the other remaining one ball, the two balls of the first ball group BG1 are respectively in contact with the carrier 7300 and housing 6000. Also, since the two balls of the second ball group BG2 have the same diameter, the two balls of the second ball group BG2 contact the carrier 7300 and the housing 6000, respectively.

Accordingly, as illustrated in FIG. 18, when viewed in the second axis (the Y-axis) direction, the second ball member B2 is in four-point contact with the carrier 7300 or the housing 6000. Also, the support region A formed by connecting the contact points to each other may have a quadrangular shape (e.g., a trapezoidal shape).

Therefore, the support region A may be formed relatively wide, and accordingly, the center point CP of the action of attractive force acting between the third magnet 8100 and the third yoke 8700 may be stably located in the support region A. Therefore, driving stability during AF may be ensured.

In an example, even if the two balls of the second ball group BG2 are manufactured to have the same diameter, the two balls of the second ball group BG2 may not physically have exactly the same diameter due to errors in terms of manufacturing. In this case, any one of the two balls of the second ball group BG2 may contact the carrier 7300 or the housing 6000.

Accordingly, the support region A formed by connecting contact points at which the second ball member B2 contacts the carrier 7300 (or the housing 6000) may have a triangular shape.

Even if the support region A has a triangular shape, the support region A may be formed to be wide by the outermost balls in a direction, parallel to the optical axis (the Z-axis), among the three balls of the first ball group BG1, and thus, driving stability during AF may be ensured.

Apart from ensuring driving stability during AF, it is also an important issue to reduce the height of the camera module 1 in the optical axis (the Z-axis) direction (i.e., slimming). When the height of the camera module 1 in the Z-axis direction is simply reduced, the height of the support region A in the optical axis (the Z-axis) direction may also be reduced.

That is, simply reducing the height of the camera module 1 in the optical axis (the Z-axis) direction may cause a problem in driving stability during AF.

In an example embodiment in the present disclosure, an auxiliary yoke 8710 may be disposed in a position facing the third magnet 8100. For example, the auxiliary yoke 8710 may be disposed on the substrate 8900 to face the third magnet 8100.

The auxiliary yoke 8710 may be located closer to the main guide than to the auxiliary guide. The auxiliary yoke 8710 is a material capable of generating attractive force with respect to the third magnet 8100.

Therefore, the resultant force of attractive force acting between the third magnet 8100 and the third yoke 8700 the attractive force generated between the third magnet 8100 and the auxiliary yoke 8710 may allow the auxiliary yoke 8710 to be located closer to the main guide than to the auxiliary guide.

In another example embodiment, on one side of the carrier 7300, the third magnet 8100 may be disposed eccentrically to one side in a longitudinal direction (e.g., the first axis direction (the X-axis direction)) of the third magnet 8100.

The center of one side of the carrier 7300 and the center of the third magnet 8100 may be misaligned. The direction in which the third magnet 8100 is eccentric may be toward the main guide.

That is, the third magnet 8100 may be disposed to be closer to the main guide than to the auxiliary guide.

Since a length of the support region A in the optical axis (the Z-axis) direction is longer toward the main guide, the center point CP of the action of attractive force may be more stably located in the support region A by placing the third magnet 8100 to be closer to the main guide.

In another example embodiment, among the main guide and the auxiliary guide, the lengths of the first recess g1 and the third recess g3 corresponding to the main guide are configured to be longer than the lengths of the second recess g2 and the fourth recess g4, thereby increasing the size of the support region A.

That is, by forming the lengths of the space in which each ball group is accommodated in the optical axis (the Z-axis) direction to be different from each other, a change in the size of the support region A may be prevented, or the center point CP of the action of attractive force may not deviate from the support region A although the size of the support region A is changed.

In an example, the second actuator 20 may detect a position of the carrier 7300 in the optical axis (the Z-axis) direction.

To this end, a third position sensor 8500 is provided. The third position sensor 8500 is disposed on the substrate 8900 to face the third magnet 8100. The third position sensor 8500 may be a Hall sensor.

In the camera module 1 according to an example embodiment in the present disclosure, the lens module 7000 is configured to move in the optical axis (the Z-axis) direction during AF, and the image sensor S is configured to move in a direction, perpendicular to the optical axis (the Z-axis) during OIS.

Therefore, even if the lens module 7000 is moved in the optical axis (the Z-axis) direction during AF, the relative positions of the magnets and coils of the first drive unit 3000 do not change, so that driving force for OIS may be precisely controlled.

In addition, even if the image sensor S is moved in a direction, perpendicular to the optical axis, during OIS, the relative positions of the magnet and the coil of the second driving unit 8000 do not change, so that driving force for AF may be precisely controlled.

Hereinafter, a camera module 1' according to another example embodiment in the present disclosure will be described with reference to FIGS. 19 to 28.

In the camera module 1' according to another example embodiment in the present disclosure, the first magnet 3110 and the second magnet 3310 are moving members, and the first coil 3130 and the second coil 3330 are fixed members.

For example, the first magnet 3110 and the second magnet 3310 are moving members mounted on a movable frame 2000' and moving together with the movable frame 2000', and the first coil 3130 and the second coil 3330 are fixed members fixed to a fixed frame 1000'.

That is, when compared with the camera module 1 according to an example embodiment in the present disclosure described above, in the camera module 1' according to another example embodiment in the present disclosure, positions of the first magnet 3110 and the first coil 3130 are interchanged, and positions of the second magnet 3310 and the second coil 3330 are also interchanged.

The first magnet 3110 and the second magnet 3310 are disposed in the movable frame 2000'. A mounting recess 2200 in which the first magnet 3110 and the second magnet 3310 are disposed may be provided on an upper surface of the movable frame 2000' (refer to FIG. 28). By disposing the first magnet 3110 and the second magnet 3310 in the mounting recess 2200, an increase in overall height of the camera module 1' due to a thickness of the first magnet 3110 and the second magnet 3310 may be prevented.

The first coil 3130 is disposed to face the first magnet 3110 in the optical axis (the Z-axis) direction, and the second coil 3330 is disposed to face the second magnet 3310 in the optical axis (the Z-axis) direction. For example, the first coil 3130 and the second coil 3330 are disposed on the fixed frame 1000'.

Referring to FIGS. 22 to 26, the fixed frame 1000' has a wiring pattern 1100 therein, and the wiring pattern 1100 may be connected to the first coil 3130 and the second coil 3330. Also, the wiring pattern 1100 of the fixed frame 1000' may also be connected to the sensor substrate 4000. For example, the wiring pattern 1100 may be connected to the fixed portion 4300 of the sensor substrate 4000.

Accordingly, the first coil 3130 and the second coil 3330 may receive power through the wiring pattern 1100 disposed on the fixed frame 1000'.

That is, instead of disposing a separate printed circuit board (PCB) for supplying power to the first driving unit 3000 in the fixed frame 1000', the fixed frame 1000' itself is provided with the wiring pattern 1100 to supply power to the first driving unit 3000.

The wiring pattern 1100 may be integrally coupled to the fixed frame 1000' by insert-injection. For example, the wiring pattern 1100 may be manufactured to be integrated with fixed frame 1000' by injecting a resin material into a mold while the wiring pattern 1100 is disposed in the mold.

The camera module 1' according to another example embodiment in the present disclosure may undergo injection at least twice in the process of manufacturing the fixed frame 1000'.

If a pattern width of the wiring pattern 1100 is minimized to reduce the size, rigidity of the wiring pattern 1100 may not be sufficient and it may be difficult to fix a position of the wiring pattern 1100 during insert-injection molding.

Therefore, the fixed frame 1000' having the wiring pattern 1100 therein may be manufactured by manufacturing a first injection-molded product (e.g., the first frame 1400) integrated with the wiring pattern 1100 by insert-injection and then manufacturing a second injection-molded product (e.g., the second frame 1500) integrated with the first injection-molded product by insert-injecting the first injection-molded product.

Since injection is performed at least twice, a boundary line BL is formed between the first frame 1400, which is the first injection-molded product, and the second frame 1500, which is the second injection-molded product.

The first coil 3130, the second coil 3330, the first position sensor 3150, and the second position sensor 3350 are disposed on the first frame 1400, which is a first injection-molded product. The first coil 3130, the second coil 3330, the first position sensor 3150, and the second position sensor 3350 are connected to the wiring pattern 1100 provided on the first frame 1400.

Figure 25:
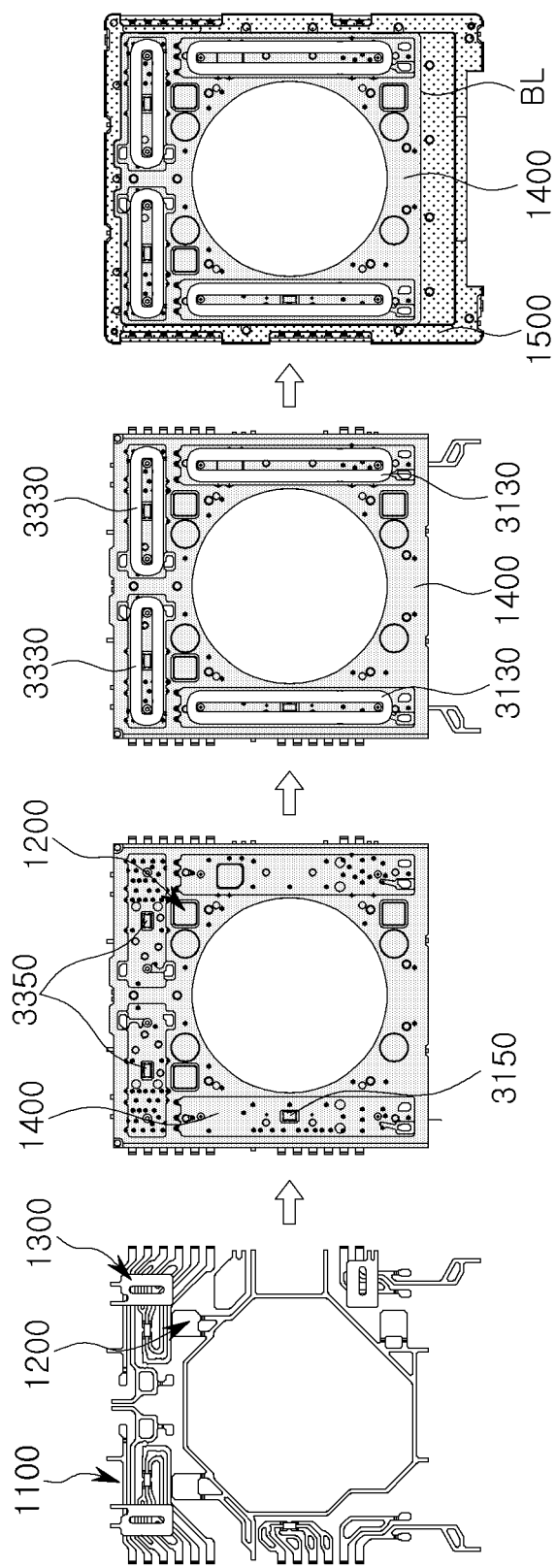
FIG. 25 is a view illustrating a manufacturing process of a fixed frame of a first actuator according to another example embodiment in the present disclosure.
Figure 26:
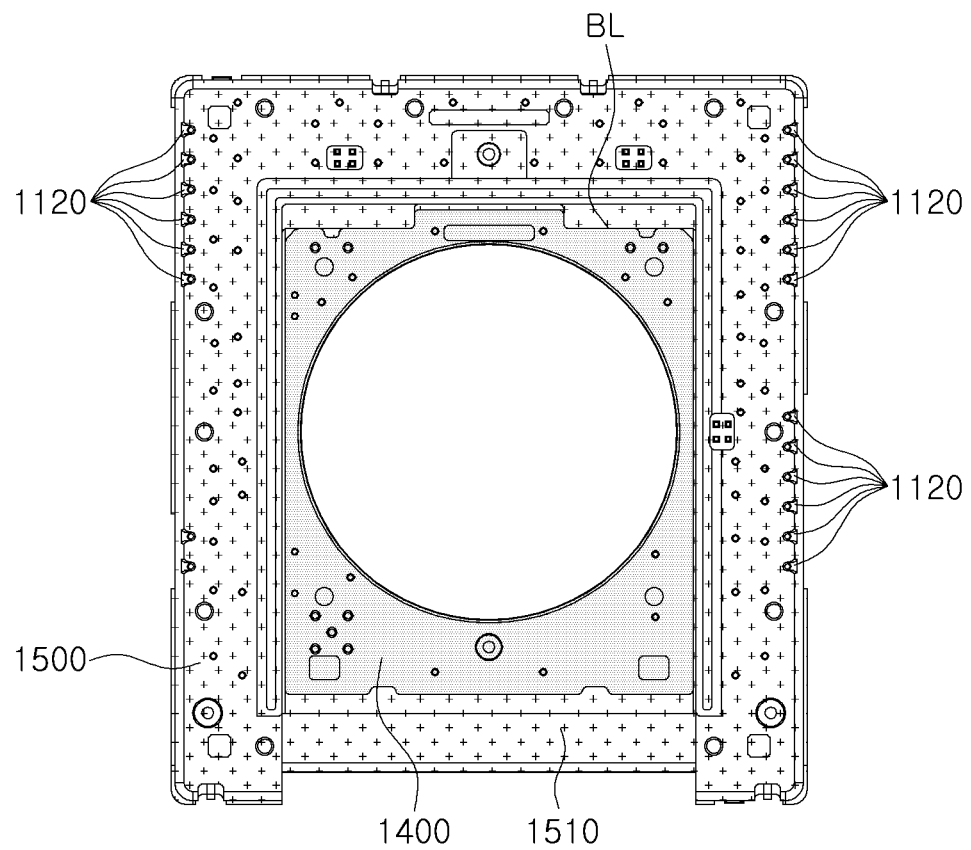
FIG. 26 is a plan view illustrating a structure before a shield can is coupled to a fixed frame of a first actuator according to another example embodiment in the present disclosure.
Figure 27:
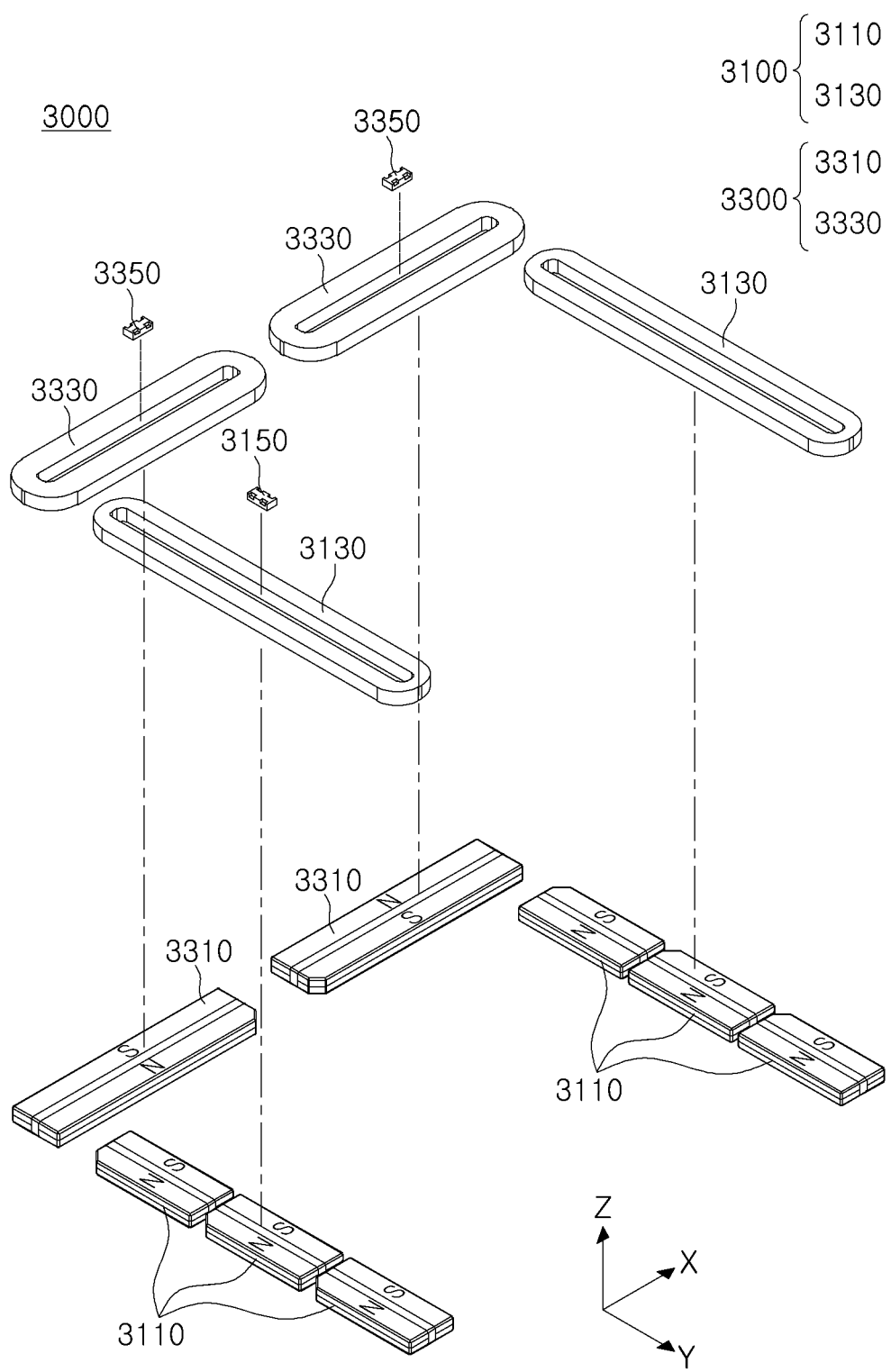
FIG. 27 is an exploded perspective view of a first driving unit of a first actuator according to another example embodiment in the present disclosure.

In an example embodiment of FIG. 25, it is illustrated that, after the first injection, the first position sensor 3150, the second position sensor 3350, the first coil 3130, and the second coil 3330 are disposed on the first frame 1400, followed by a second injection. However, the present disclosure is not limited thereto and the first coil 3130 and the second coil 3330 may be disposed on the first frame 1400 after the second injection. In addition, the first position sensor 3150 and the second position sensor 3350 may also be disposed on the first frame 1400 after the second injection.

The wiring pattern 1100 includes a wiring portion 1110 and a terminal portion 1120, the wiring portion 1110 is located inside the first frame 1400, and the terminal portion 1120 is disposed to be exposed externally of the first frame 1400. Also, the terminal portion 1120 is disposed to be exposed also to the outside of the second frame 1500. As the terminal portion 1120 of the wiring pattern 1100 is connected to the sensor substrate 4000, power may be applied to the first coil 3130 and the second coil 3330 through the wiring pattern 1100.

In an example, a first guide recess 1700 in which the first ball member B1 is disposed is formed in the first frame 1400. Since a material of the first ball member B1 may be ceramics and a material of the first frame 1400 is plastic, the first guide recess 1700 may be damaged due to a difference in rigidity.

Therefore, in order to prevent damage to the first guide recess 1700, a support pad 1200 may be disposed on a bottom surface of the first guide recess 1700, and the support pad 1200 may be insert-injected in a first injection process and integrated with the first frame 1400, like the wiring pattern 1100. The support pad 1200 may be formed of a stainless steel material.

A portion of the support pad 1200 may be disposed inside the first frame 1400 and another portion of the support pad 1200 may be disposed to be exposed externally of the first frame 1400.

The support pad 1200 exposed externally of the first frame 1400 may form a bottom surface of the first guide recess 1700. Accordingly, the first ball member B1 may roll in contact with the support pad 1200.

A yoke portion 1300 is disposed inside the fixed frame 1000'. The yoke portion 1300 provides attractive force so that the fixed frame 1000' and the movable frame 2000' may be maintained in contact with the first ball member B1.

The yoke portion 1300 may be insert-injected in the first injection process and integrated with the first frame 1400, like the wiring pattern 1100.

The yoke portion 1300 is disposed to face the first magnet 3110 and the second magnet 3310 in the optical axis (the Z-axis) direction. The yoke portion 1300 includes a plurality of yokes. For example, the yoke portion may include two yokes facing the two magnets included in the second magnet 3310 and two yokes facing the two sets of magnets of the first magnet.

The number of yoke portions 1300 is not particularly limited, but a center point of the action of attractive force acting between the first magnet 3110 and the second magnet 3310 and the yoke portion 1300 needs to be located within the support region formed by connecting a plurality of balls included in the first ball member B1.

Figure 22:
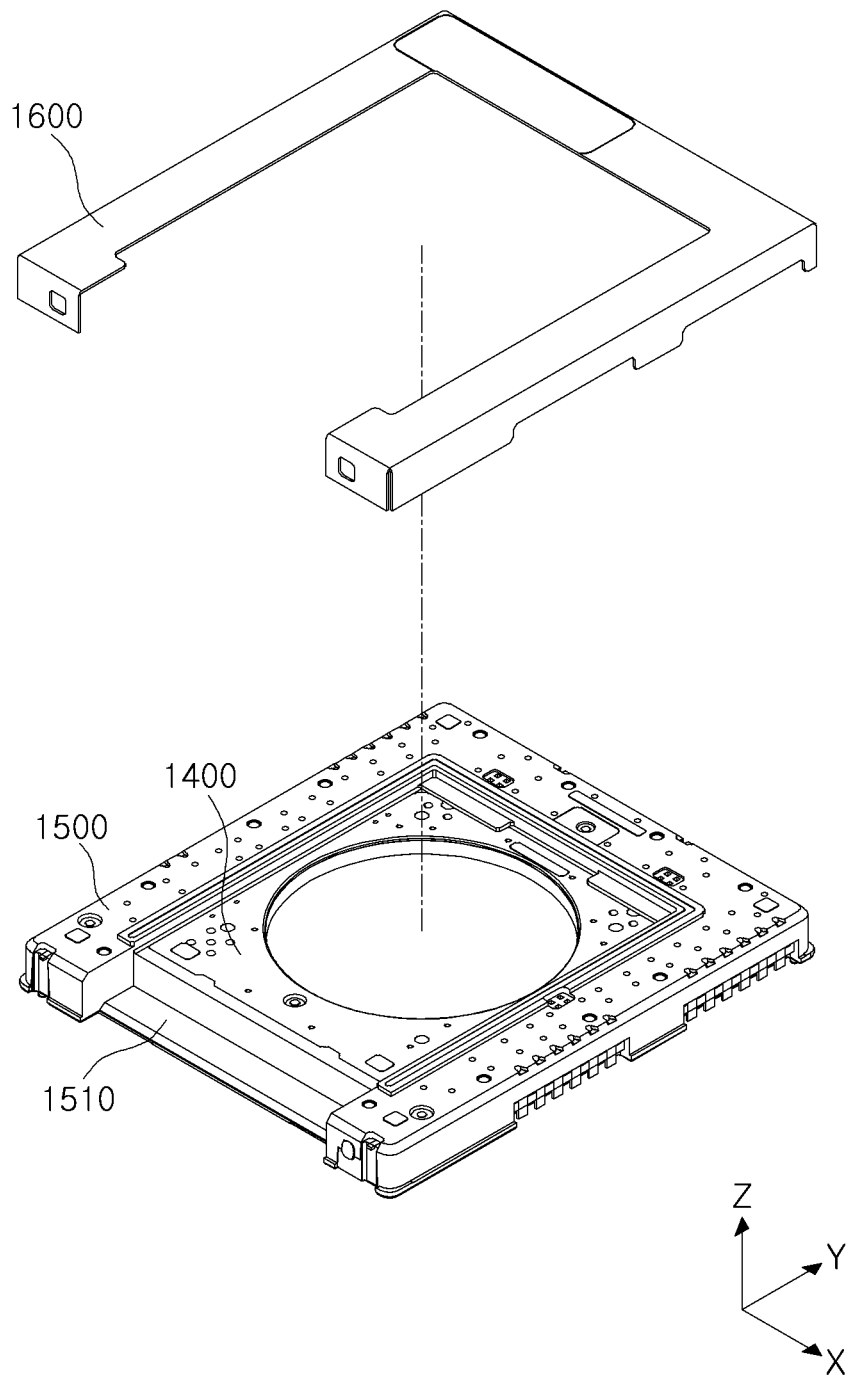
FIG. 22 is a perspective view of a fixed frame of a first actuator according to another example embodiment in the present disclosure.
Figure 23:
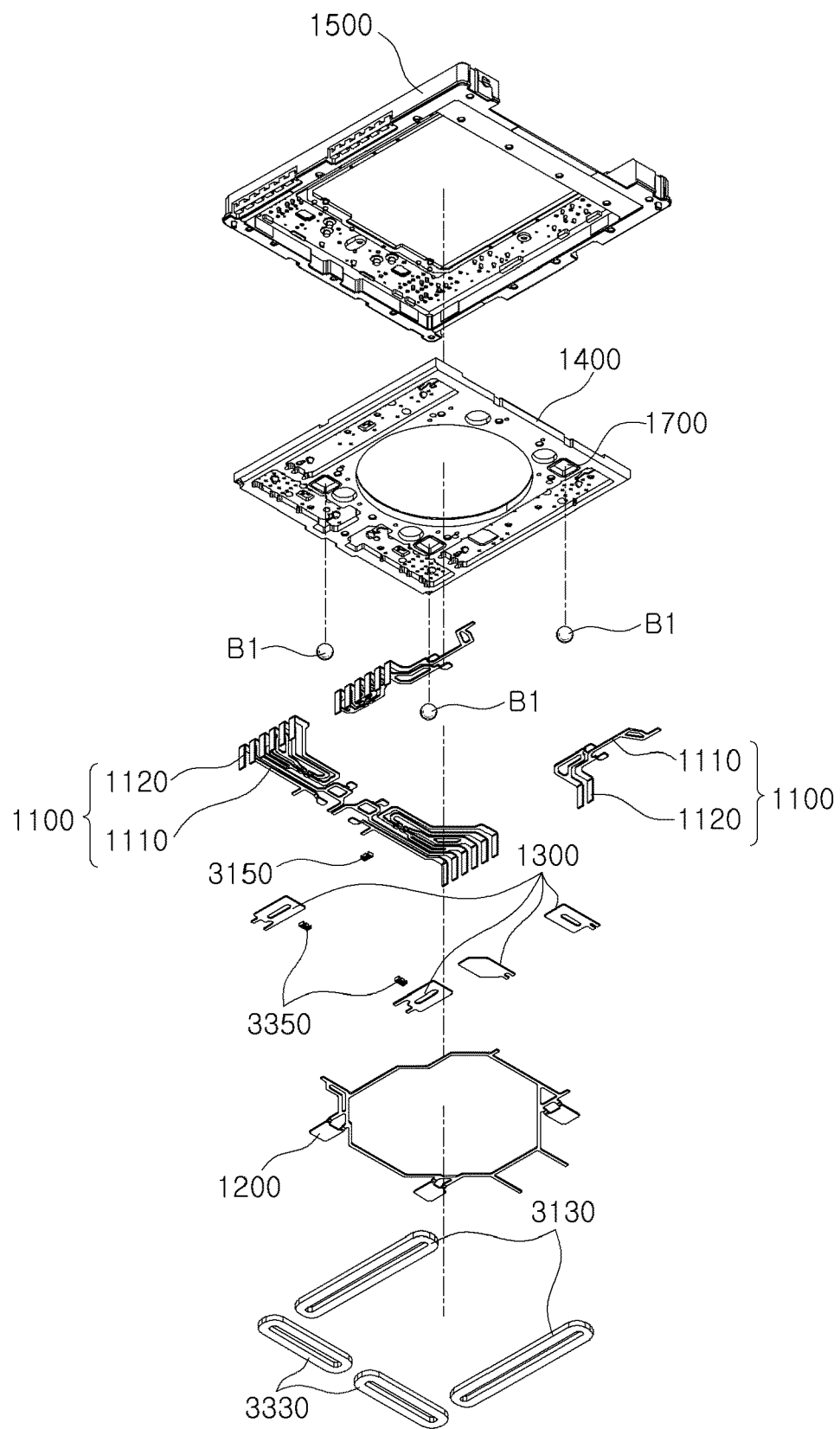
FIG. 23 is an exploded bottom perspective view of a fixed frame of a first actuator according to another example embodiment in the present disclosure.
Figure 24:
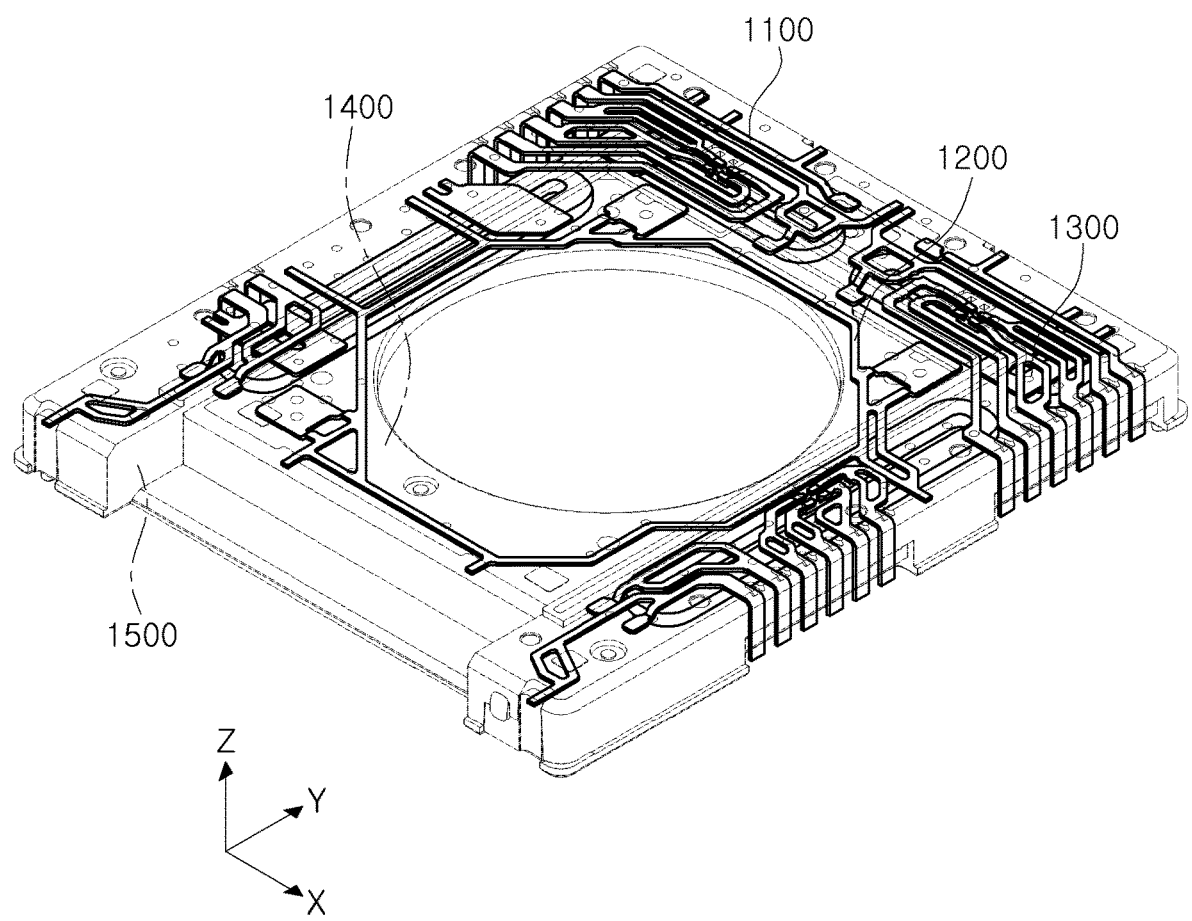
FIG. 24 is a perspective view illustrating a wiring pattern, a support pad, and a yoke portion disposed inside a fixed frame of a first actuator according to another example embodiment in the present disclosure.

In an example, the fixed frame 1000' may further include a shield can 1600. Referring to FIG. 22, after the second injection in the manufacturing process of the fixed frame 1000', the shield can 1600 may be coupled to cover at least a portion of the upper and side surfaces of the second frame 1500, which is the second injection-molded product. The shield can 1600 may serve to shield electromagnetic waves.

In an example, since the movable frame 2000' is accommodated in the fixed frame 1000', it is necessary to reduce a thickness of the movable frame 2000' to reduce a height of the first actuator 10' in the optical axis (the Z-axis) direction.

However, a reduction in the thickness of the movable frame 2000' may weaken the rigidity of the movable frame 2000' and the reliability against external impact may deteriorate.

Therefore, in order to reinforce the rigidity of the movable frame 2000', the movable frame 2000' may include a reinforcing plate 2500.

Figure 28:
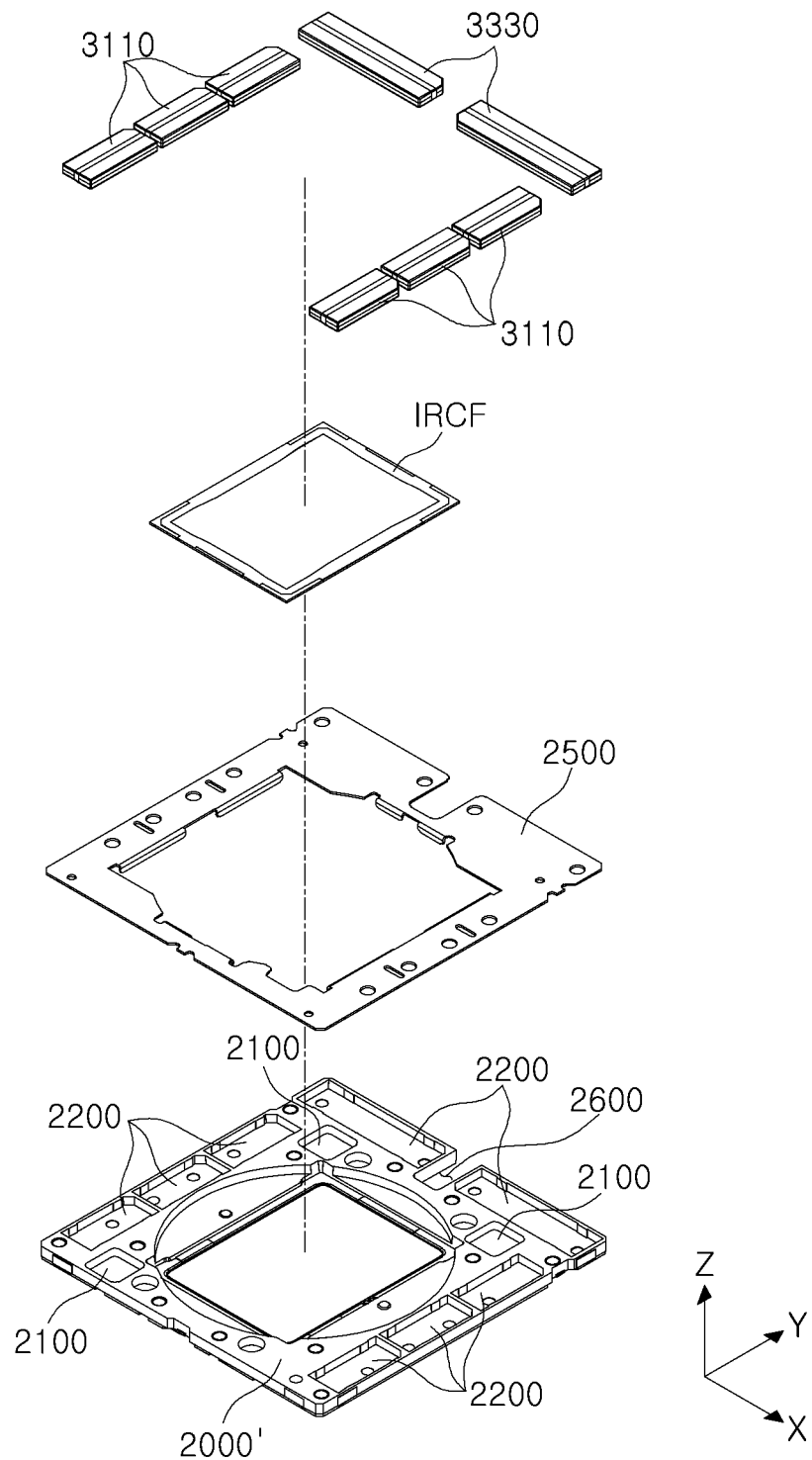
FIG. 28 is a perspective view of a movable frame of a first actuator according to another example embodiment in the present disclosure.

For example, referring to FIG. 28, the reinforcing plate 2500 may be integrally coupled to the movable frame 2000' by insert-injection. In this case, the reinforcing plate 2500 may be manufactured to be integrated with the movable frame 2000' by injecting a resin material into a mold, while the reinforcing plate 2500 is fixed in the mold.

The reinforcing plate 2500 may be disposed inside the movable frame 2000'. In addition, the reinforcing plate 2500 may be disposed such that a portion thereof is exposed externally of the movable frame 2000'. In this manner, by exposing a portion of the reinforcing plate 2500 to the outside of the movable frame 2000', while the reinforcing plate 2500 is integrally formed inside the movable frame 2000', bonding strength between the reinforcing plate 2500 and the movable frame 2000' may be improved and the reinforcing plate 2500 may be prevented from being separated from the movable frame 2000'.

In an example, the reinforcing plate 2500 may be formed of stainless steel material.

The actuator for optical image stabilization (OIS) and the camera module including the same according to an example embodiment in the present disclosure may improve OIS performance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for optical image stabilization, the actuator comprising:
    a fixed frame having an internal space;
    a movable frame accommodated in the fixed frame and movable relative to the fixed frame;
    a first driving unit comprising a plurality of coils disposed on one of the fixed frame and the movable frame and a plurality of magnets disposed on the other; and
    a sensor substrate comprising a moving portion coupled to the movable frame,
    wherein a wiring pattern is disposed inside one of the fixed frame and the movable frame,
    wherein the plurality of coils and the sensor substrate are electrically connected by the wiring pattern,
    wherein the sensor substrate further comprises a fixed portion coupled to the fixed frame and a connection portion connecting the moving portion to the fixed portion, and
    wherein the connection portion extends along a circumference of the moving portion.

2. The actuator of claim 1, wherein an image sensor is disposed on the moving portion.

3. The actuator of claim 1, further comprising;
a first ball member disposed between the fixed frame and the movable frame,
wherein any one of the fixed frame and the movable frame includes a first frame in which the plurality of coils are disposed and a second frame in which the first ball member is disposed, and
wherein the first frame and the second frame are formed of the same or different plastic materials, respectively.

4. The actuator of claim 3, wherein a plurality of yokes facing the plurality of magnets are disposed in the first frame.

5. The actuator of claim 3, wherein a support pad is disposed inside the second frame, and one surface of the support pad is exposed externally of the second frame to contact the first ball member.

6. The actuator of claim 1, wherein
the plurality of coils are disposed on the movable frame, and
one end of the wiring pattern is connected to the plurality of coils, and the other end of the wiring pattern is connected to the moving portion.

7. The actuator of claim 1, wherein
the connection portion comprises a first support portion and a second support portion,
the first support portion has one side connected to the moving portion and the other side spaced apart from the fixed portion,
the second support has one side connected to the fixed portion and the other side spaced apart from the moving portion.

8. The actuator of claim 1, wherein
the plurality of coils are disposed on the fixed frame, and
one end of the wiring pattern is connected to the plurality of coils, and the other end of the wiring pattern is connected to the fixed portion.

9. The actuator of claim 1, wherein
an image sensor is disposed on the moving portion,
the first driving unit comprises a first sub-driving unit comprising a first magnet and a first coil and a second sub-driving unit comprising a second magnet and a second coil,
the first sub-driving unit and the second sub-driving unit generate driving force in directions parallel to an imaging surface of the image sensor and perpendicular to each other.

10. The actuator of claim 9, wherein
at least one of the first coil and the second coil comprises two coils, and
a position sensor is disposed inside each of the two coils.

11. The actuator of claim 1, wherein
the movable frame comprises a plurality of damping recesses, the fixed frame comprises a plurality of damping pins extending toward the plurality of damping recesses,
a damping gel is disposed in the plurality of damping recesses, and at least a portion of the plurality of damping pins are inserted into the damping gel.

12. A camera module comprising:
the actuator of claim 1;
a housing disposed on the fixed frame and having an internal space; and
a lens module accommodated in the internal space and configured to be movable in an optical axis direction.

13. A camera module comprising:
a housing having an internal space;
a lens module accommodated in the internal space and configured to be movable in an optical axis direction;
a fixed frame fixedly disposed in the housing;
a movable frame, movable relative to the fixed frame in a direction, perpendicular to the optical axis direction;
a first driving unit comprising a plurality of coils disposed on one of the fixed frame and the movable frame and a plurality of magnets disposed on the other; and
a sensor substrate comprising a moving portion coupled to the movable frame, and an image sensor disposed on the moving portion,
wherein a wiring pattern is disposed inside one of the fixed frame and the movable frame,
wherein one end of the wiring pattern is connected to the plurality of coils, and the other end of the wiring pattern is connected to the sensor substrate,
wherein the sensor substrate further comprises a fixed portion coupled to the fixed frame and a connection portion connecting the moving portion to the fixed portion, and
wherein the connection portion extends along a circumference of the moving portion.

14. The camera module of claim 13, wherein
the plurality of coils are disposed on the movable frame, and
the wiring pattern comprises a wiring portion connected to the plurality of coils and a terminal portion connected to the moving portion.

15. The camera module of claim 13, wherein
the plurality of coils are disposed on the fixed frame, and
the wiring pattern comprises a wiring portion connected to the plurality of coils and a terminal portion connected to the fixed portion.

16. The camera module of claim 13, further comprising;
a first ball member disposed between the fixed frame and the movable frame,
wherein any one of the fixed frame and the movable frame comprises a first frame in which the plurality of coils are arranged and a second frame in which the first ball member is disposed, and
a boundary line is formed between the first frame and the second frame.

17. An optical image stabilization actuator comprising:
a fixed frame;
a movable frame disposed on the fixed frame and configured to be movable relative to the fixed frame;
a wiring pattern insert-injected in one of the fixed frame and the movable frame;
a coil directly connected to an exposed portion of the insert-injected wiring pattern; and
a sensor substrate comprising a moving portion coupled to the movable frame, a fixed portion coupled to the fixed frame, and a connection portion connecting the moving portion to the fixed portion,
wherein the connection portion extends along a circumference of the moving portion, and
wherein the wiring pattern is configured to supply power to the coil.

18. The actuator of claim 17, further comprising a magnet disposed on the other of the fixed frame and the movable frame to face the coil; and
wherein the coil and the sensor substrate are electrically connected by the wiring pattern.

19. A portable electronic device comprising:
a camera module comprising:
the actuator of claim 17,
a lens module accommodated in an internal space of a housing disposed on the fixed frame, and the lens module configured to be movable in an optical axis direction, and
a sensor substrate comprising a moving portion coupled to the movable frame, and an image sensor disposed on the moving portion.

* * * * *